United States Patent
Primus et al.

(10) Patent No.: US 11,536,221 B2
(45) Date of Patent: Dec. 27, 2022

(54) PISTON CROWN FOR A COMBUSTION SYSTEM AND AN ASSOCIATED METHOD THEREOF

(71) Applicant: Transportation IP Holdings, LLC, Norwalk, CT (US)

(72) Inventors: Roy James Primus, Niskayuna, NY (US); Adam Edgar Klingbeil, Ballston Lake, NY (US); Dattatraya Somnath Bhagoji, Bengaluru (IN); Kevin Scott McElhaney, Erie, PA (US); Bhaskar Tamma, Bengaluru (IN); Ravichandra Srinivasa Jupudi, Bengaluru (IN); Kevin Paul Bailey, Mercer, PA (US)

(73) Assignee: TRANSPORTATION IP HOLDINGS, LLC, Norwalk, CT (US)

(*) Notice: Subject to any disclaimer, the term of this patent is extended or adjusted under 35 U.S.C. 154(b) by 0 days.

(21) Appl. No.: 17/524,954

(22) Filed: Nov. 12, 2021

(65) Prior Publication Data
US 2022/0074366 A1  Mar. 10, 2022

Related U.S. Application Data

(63) Continuation-in-part of application No. 17/071,721, filed on Oct. 15, 2020, now Pat. No. 11,199,155, which is a continuation of application No. 16/252,641, filed on Jan. 20, 2019, now Pat. No. 10,837,401.

(51) Int. Cl.
 *F02F 3/26* (2006.01)
 *F02F 3/24* (2006.01)
 *F02F 3/28* (2006.01)

(52) U.S. Cl.
 CPC ............. *F02F 3/24* (2013.01); *F02F 3/26* (2013.01); *F02F 3/28* (2013.01)

(58) Field of Classification Search
 CPC ........ F02F 3/24; F02F 3/26; F02F 3/28; F02F 3/285
 See application file for complete search history.

(56) References Cited

U.S. PATENT DOCUMENTS

2019/0376466 A1* 12/2019 Svensson ............ F02B 23/0669

* cited by examiner

*Primary Examiner* — Jacob M Amick
(74) *Attorney, Agent, or Firm* — Christopher R. Carroll; The Small Patent Law Group LLC

(57) ABSTRACT

A piston crown for a combustion system is disclosed. The piston crown includes a piston bowl having a circumferential recess and a plurality of first recesses arranged spaced apart from each other along a circumferential direction. The circumferential recess is disposed proximate to a circumference of the piston crown. Each recess of the plurality of the first recesses extends between a center of the piston crown and the circumferential recess, and a width and a depth of each recess of the plurality of first recesses are extended along a radial direction for an entire length of each recess of the plurality of first recesses.

20 Claims, 18 Drawing Sheets

PISTON CROWN FOR A COMBUSTION SYSTEM AND AN ASSOCIATED METHOD THEREOF

CROSS-REFERENCE TO RELATED APPLICATIONS

This application is a continuation-in-part of U.S. patent application Ser. No. 17/071,721 (filed 15 Oct. 2020), which is a continuation of U.S. patent application Ser. No. 16/252,641 (filed 20 Jan. 2019, now U.S. Pat. No. 10,837,401), the entire disclosures of these applications are incorporated herein by reference.

BACKGROUND

Technical Field

Examples of the present specification relate to a combustion system, and more particularly, to a piston crown for the combustion system and an associated method of controlling combustion of fuel in the combustion system.

Discussion of Art

Designers of combustion systems for internal combustion (IC) engines have been confronted with stringent requirements relating to fuel economy and exhaust emissions. With the engines, such as compression ignition engines, commonly called "diesel" engines, certain exhaust emission components including oxides of nitrogen ($NO_x$), and soot (particulate matter) are more difficult to control. In certain combustion system, $NO_x$ may be reduced by lowering peak flame temperature in the engines. However, this may increase the soot emissions of the engines. Further, $NO_x$ may be controlled in some engines by retarding injection timing. However, this may have the effect of increasing fuel consumption. Certain other combustion systems may utilize an exhaust aftertreatment device to reduce emissions. However, the exhaust aftertreatment device may add to maintenance and overall costs of the engine. Thus, the core challenge is to control the diesel combustion event to provide the best trade-off between the fuel efficiency and targeted emissions.

Accordingly, there is a need for an improved combustion system and an associated method for controlling combustion of fuel in the combustion system.

SUMMARY

In accordance with one example, a piston crown for a combustion system is disclosed. The piston crown includes a piston bowl having a circumferential recess disposed proximate to a circumference of the piston crown, and a plurality of first recesses arranged spaced apart from each other along a circumferential direction. Each recess of the plurality of the first recesses extends between a center of the piston crown and the circumferential recess, and a width and a depth of each recess of the plurality of first recesses are extended along a radial direction for an entire length of each recess of the plurality of first recesses.

In accordance with another example, a piston crown for a combustion system is disclosed. The piston crown includes a piston bowl having a plurality of recesses arranged spaced apart from each other along a circumferential direction. Each recess of the plurality of recesses extends between a center and a circumference of the piston crown, wherein a width and a depth of each recess of the plurality of recesses are varied along a radial direction for an entire length of each recess of the plurality of recesses. The depth of each recess of the plurality of recesses is further varied along the circumferential direction.

In accordance with yet another example, a piston crown for a combustion system is disclosed. The piston crown includes a piston bowl having a plurality of vanes or protrusions arranged spaced apart from each other along a circumferential direction, where each vane or protrusion is disposed between a center and a peripheral wall of the piston bowl.

BRIEF DESCRIPTION OF THE DRAWINGS

These and other features and aspects of examples of the present specification will become better understood when the following detailed description is read with reference to the accompanying drawings in which like characters represent like parts throughout the drawings, wherein.

DETAILED DESCRIPTION

Examples discussed herein disclose a piston crown and a combustion system for an engine having the piston crown. The engine may be an internal combustion (IC) engine or another type of engine. In some examples, the piston crown is detachably coupled to a piston skirt, thereby providing an option to retrofit the piston crown to a piston. In some other examples, the piston crown and the piston skirt are integrated to one another to form a unitary piston. In certain examples, the piston crown may provide in-cylinder solutions for controlling combustion of fuel to notably reduce soot (particulate matter). In certain example examples, various designs of the piston crown as discussed herein may be used for controlling combustion of the fuel, thereby regulate emission and improve fuel efficiency of the engine. Further, the combustion system may not require an exhaust after-treatment device, thus reducing the packaging challenges, potential reliability issues associated with the exhaust after-treatment device, and also reducing the cost and complexity of the combustion system.

Figure 1:
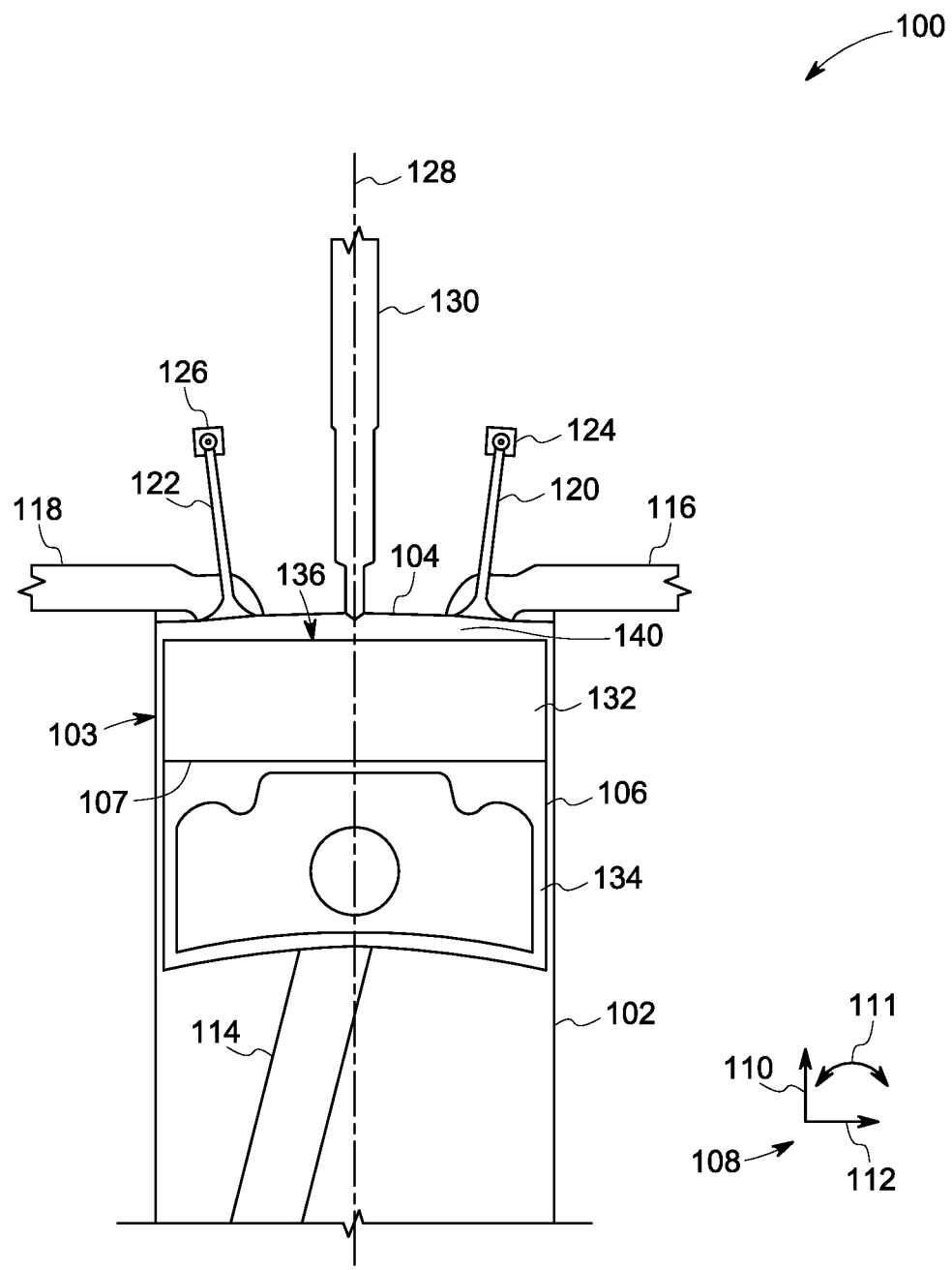
FIG. 1 illustrates a schematic diagram of a combustion system, in accordance with one example of the present disclosure.

FIG. 1 shows a schematic diagram of a combustion system 100 for an engine, for example, an internal combustion engine (i.e., engine 103) in accordance with one example. In some examples, the combustion system includes a cylinder 102 (at least one cylinder), a piston 106 (at least one piston), and a fuel injector 130 (at least one fuel injector). In some other examples, the combustion system may include a plurality of cylinders, for example, first cylinders that are not configured deliver exhaust gas recirculation and/or second cylinders that are configured to provide exhaust gas recirculation (not shown in FIG. 1) and other corresponding components, such as a plurality of pistons and a plurality of fuel injectors, and the like. It should be noted herein that the term "at least one cylinder" and "cylinder," "at least one piston" and "piston," and "at least one fuel injector" and "fuel injector" may be used interchangeably. Further, the coordinate axes 108 includes axes extending along a longitudinal direction 110, a circumferential direction 111, and a radial direction 112 of the combustion system.

In some examples, the cylinder may be defined by a block of metal having at least one cylindrical aperture formed therein for receiving the piston. The cylinder has a central axis 128 and includes a cylinder head 104 at a top with respect to the vertical axis or longitudinal direction of the cylinder. In one or more examples, the cylinder may receive intake air from an intake passage 116 and release combustion gases to an exhaust passage 118. The intake passage may be coupled to an intake manifold (not shown) of the engine, and the exhaust passage may be coupled to an exhaust manifold (not shown) of the engine. In some examples, the intake passage and the exhaust passage selectively communicates with the cylinder by an intake valve 120 and an exhaust valve 122 respectively. In the illustrated example, the intake valve and the exhaust valve are positioned within the cylinder head and at the top of the cylinder. Further, the intake valve and the exhaust valve are controlled by cam actuation systems 124, 126 respectively.

In the illustrated example, the fuel injector is a single fuel injector. In some examples, the fuel injector may be a multi-fuel injector, which may be configured to spray/inject multiple fuels, for example, direct-injection of both natural gas and diesel into the cylinder. In the example of FIG. 1, the fuel injector is coupled to the cylinder and may inject fuel, for example, diesel directly therein. Optionally, the fuel may be or include hydrogen, ammonia, ethanol fuel, In the illustrated example, the fuel injector is shown with a fuel nozzle extending into a central portion of a combustion chamber 140 of the cylinder, where the fuel nozzle includes at least one hole for injecting fuel into the cylinder and/or to a plurality of recesses formed in a piston crown 132 of the piston. In some examples, the fuel injector may include multiple holes at an end of the fuel nozzle, where at least one hole among the multiple holes may be aligned with at least one recess of the plurality of recesses for injecting/spraying the fuel into the at least one recess. Optionally, the hole(s) in the fuel injector may be aligned with vanes and/or projections described herein. In some examples, the fuel is diesel fuel that is combusted in the engine through compression ignition. In some other non-limiting examples, the fuel may be natural gas, and/or gasoline, kerosene, biodiesel, or other petroleum distillates of similar density, that may be combusted in the engine through compression ignition (and/or spark ignition). In the illustrated example, the fuel injector is positioned axially, with respect to the vertical axis or longitudinal direction and centered along the central axis. In certain other examples, the fuel injector may be inclined with respect to the longitudinal direction and may offset from the central axis, depending on design requirements and such variations should not be construed as a limitation of the present disclosure. If the fuel injector is not centrally located at the central axis of the cylinder, a central juncture of the plurality of recesses formed in the piston crown may be indexed to be located for proper alignment with the fuel injector. Such a configuration of the fuel injector may be applicable for all designs of the piston crown discussed herein. For an offset injector the plurality of recesses may no longer extend from between a center of to the circumference of the piston crown. The pattern of recesses may be substantially similar, but the central point of symmetry may be located under the fuel injector at the point of offset.

In the illustrated example, the piston is positioned within the cylinder and centered along the central axis. The piston has a cylindrical shape, and outer walls of the piston contacts and slides against interior walls of the cylinder. In one or more examples, the piston includes a piston crown 132 and a piston skirt 134. In the illustrated example, the piston crown and the piston skirt are two separate components, which are coupled (e.g., mechanically joined, for example, via a welded joint 107) to each other to form the piston. In some examples, the piston crown and the piston skirt are integral components formed as one-piece piston, for example, as a unitary piston. In some other examples, the piston crown and the piston skirt are movably coupled to each other, such that the piston crown may maintain a constant volume of a combustion chamber, when the piston reaches a bottom dead center. In one or more examples, the piston may move vertically within the cylinder with respect to the vertical axis or longitudinal direction. Further, the piston may be coupled to a crankshaft (not shown) via a connecting rod 114 so that the reciprocating motion of the piston is translated into the rotational motion of the crankshaft through the connecting rod. In some examples, the engine is a four-stroke engine in which each of the cylinders fires once in a firing order during two revolutions of the crankshaft. In some other examples, the engine may be a two-stroke engine in which each of the cylinders fires once in a firing order during one revolution of the crankshaft. Alternatively, the engine may be another type of engine.

In one or more examples, the piston crown includes a piston bowl 136 having a plurality of recesses and/or a circumferential recess (not shown in FIG. 1). In some examples, the plurality of recesses may be arranged spaced apart from each other along the circumferential direction and the circumferential recess may be disposed proximate to the circumference of the piston crown. It should be noted herein that the plurality of recesses may have various shapes/designs for controlling combustion of the fuel, which are discussed in greater details below. In one or more examples, the combustion chamber is formed between the piston crown, sides of the cylinder, and the cylinder head.

During operation of the combustion system, each cylinder may undergo four-stroke cycle: i.e., the cycle includes an intake stroke, a compression stroke, an expansion stroke, and an exhaust stroke. During the intake stroke, the exhaust valve closes and the intake valve opens, thus allowing air to be introduced into the combustion chamber via the intake passage and move the piston to bottom of the cylinder 12 so as to increase volume within the combustion chamber. The position at which the piston is proximate to the bottom of the cylinder and at the end of intake stroke (i.e., when the combustion chamber is at its largest volume) is typically referred to as bottom dead center (BDC). During the compression stroke, the intake valve and the exhaust valve are closed. The piston moves toward the cylinder head so as to compress the air within the combustion chamber. The position at which the piston is at the end of compression stroke and closest to the cylinder head (i.e., when the combustion chamber is at its smallest volume) is typically referred to as top dead center (TDC). At that stage, the fuel injector injects fuel directly into the combustion chamber. In certain examples, the fuel injector directs the fuel into one or more regions defined by the piston bowl. Thus, allowing the combustion of the fuel and compressed air to produce combustion gases (i.e., combusted air-fuel mixture). During the expansion stroke, the combustion gases push the piston back to the BDC position. The crankshaft converts the linear movement of the piston into a rotational torque of the rotary shaft. Finally, during the exhaust stroke, the exhaust valve opens to release the combustion gases to the exhaust passage and the piston returns to TDC. It should be noted herein that the above description merely is an example and should not be construed as a limitation of the present disclosure.

In one or more examples, the piston bowl having varied designs/shapes (as discussed below) may i) constrain the combustion of the fuel at an initial stage of fuel spray development so as to reduce $NO_x$ and ii) rapidly combust the fuel and oxidize soot (i.e., particulate matter generated during the initial stage) at a later stage. Thus, the piston bowl may reduce the emissions (i.e., particulate matter and $NO_x$) and specific fuel consumption.

Figure 2A:
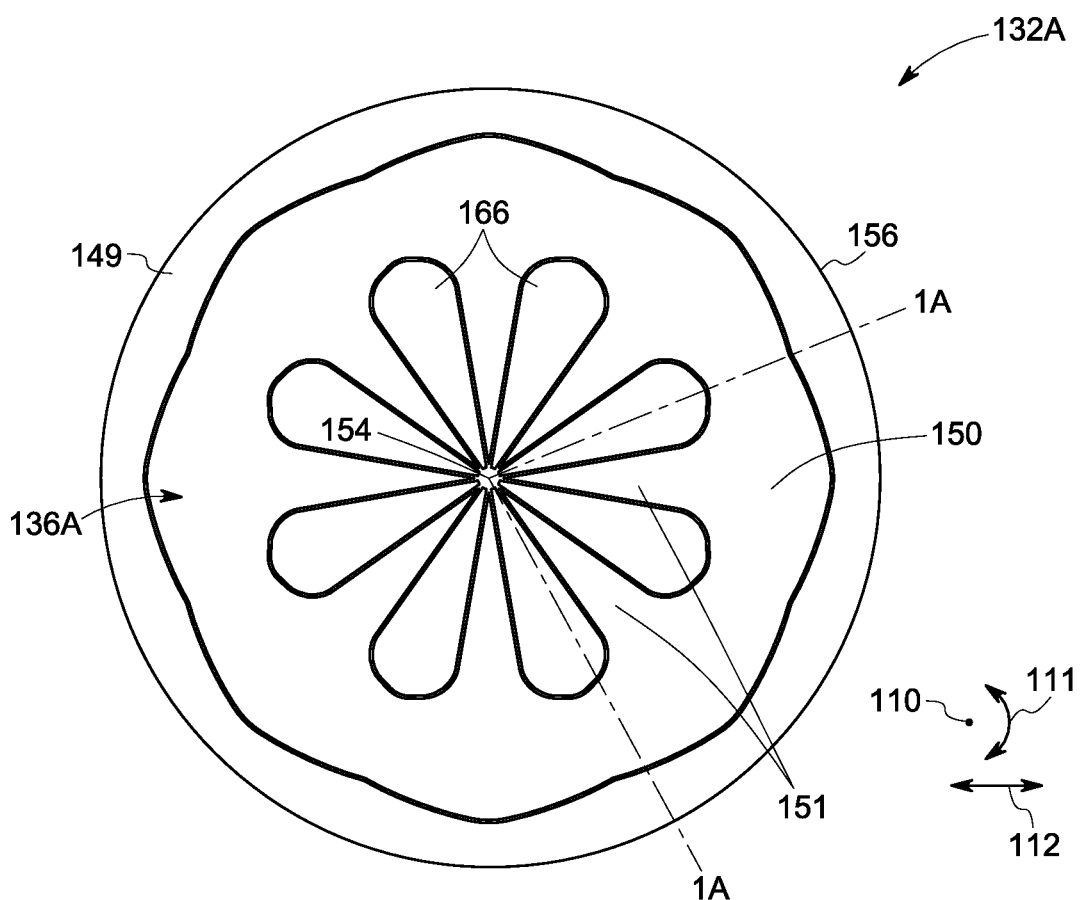
FIG. 2A illustrates an isometric view of a piston crown, in accordance with one example of the present disclosure.
Figure 2B:
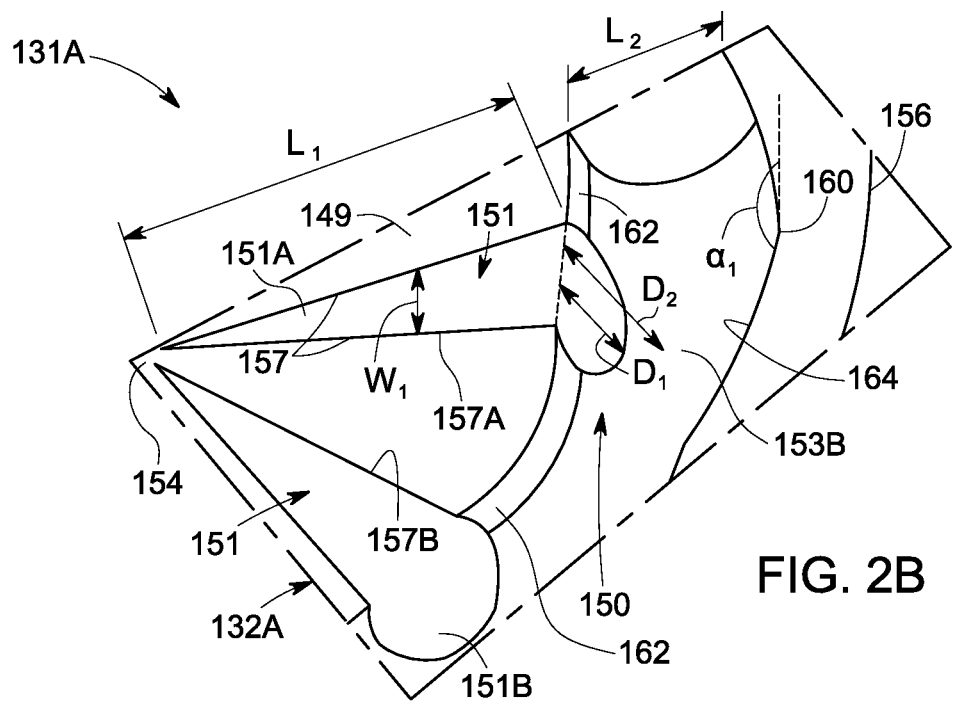
FIG. 2B illustrates a schematic diagram of a portion of the piston crown taken along a sector 1A-1A of FIG. 2A, in accordance with one example of the present disclosure.

FIG. 2A shows an isometric view of a piston crown 132A in accordance with one example. FIG. 2B shows a schematic diagram of a portion 131A of the piston crown taken along a sector 1A-1A of FIG. 2A in accordance with one example. The piston crown is a cylindrical component having a top side 149 and a bottom side located opposite to the top side. In certain examples, the top side of the piston crown may face the cylinder head (as shown in FIG. 1). The bottom side of the piston crown may have a flat surface coupled to the piston skirt (as shown and discussed in the example of FIG. 1). In one or more examples, a piston bowl 136A is formed on the top side of the piston crown. The piston bowl includes a circumferential recess 150 and a plurality of first recesses 151. In one example, the circumferential recess is disposed proximate to a circumference 156 of the piston crown, and the plurality of first recesses is arranged spaced apart from each other along the circumferential direction. Specifically, each recess of the plurality of first recesses between a center 154 of the piston crown and the circumferential recess. It should be noted herein that the plurality of first recesses may also be referred herein as "a plurality of radial recesses." Further, it should be noted herein that the circumferential recess may extend 360 degrees on the top side of the piston crown. In the illustrated example of FIGS. 2A and 2B, the piston bowl includes eight first recesses and one circumferential recess.

In one example, each recess of the plurality of first recesses has a width "$W_1$" and a depth "$D_1$" (shown in FIG. 2B). In some examples, the width "$W_1$" and the depth "$D_1$" are varied along the radial direction for an entire length "$L_1$" of each recess of the plurality of first recesses. In the example of FIG. 2, the width "$W_1$" and the depth "$D_1$" are extended (or increased) from the center toward the circumferential recess. Each recess of the plurality of first recesses is defined by a pair of side walls 157 diverging from the center to the circumferential recess. In the illustrated example, the pair of side walls are straight walls extending tangentially along the radial direction. It should be noted herein that the piston bowl includes a plurality of pairs of side walls 157 spaced apart and separated from one another by a non-recessed portion 166 of the piston crown. The circumferential recess has a depth "$D_2$" (shown in FIG. 2B). In some examples, the depth "$D_2$" is varied along the radial direction for an entire length "$L_2$" of the circumferential recess. In the example, the depth "$D_2$" of the circumferential recess is greater than the depth "$D_1$" of each recess of the plurality of first recesses. The circumferential recess is defined by a peripheral wall 160 disposed proximate to the circumference and extending along the circumferential direction, and a plurality of intermediate walls 162 spaced apart from the peripheral wall. Specifically, each wall of the plurality of intermediate walls extends between mutually opposite side walls 157A, 157B of adjacent recesses 151A, 151B of the plurality of first recesses. Each recess of the plurality of first recesses is a channel like-structure having an opened-half conical shaped profile. The piston bowl includes a reentrant lip 164 disposed on the peripheral wall. In one example, the reentrant lip may be an integral portion of the peripheral wall. In some other examples, the reentrant lip may be separate component, which may be coupled to the peripheral wall. In one example, the reentrant lip is inclined at a reentrancy angle "$\alpha_1$" relative to the longitudinal direction (in other words a straight line extending perpendicular to the radial direction).

During operation of the combustion system, a fuel injector (as shown in FIG. 1) may distribute fuel based on a number of the plurality of first recesses formed in the piston crown and inject the fuel into combustion chamber (as shown in FIG. 1). Specifically, the fuel injector may direct the fuel along the plurality of first recesses to initially constrain the fuel with less quantity of air for the combustion of the fuel. The constraining of the fuel for the combustion of the fuel may result in formation of a large quantity of soot (particulate matter) at substantially the same level of $NO_x$ and reduced initial apparent heat release rate (i.e., HRR). Further, the fuel and/or the particulate matter (i.e., reacting plumes) are directed toward the circumferential recess, where the reacting plumes are exposed to an unutilized quantity of air for rapid combustion/oxidation of the reacting plumes to substantially complete the combustion, thereby increasing the apparent HRR. Thus, the piston crown may provide in-cylinder solutions for reducing emissions and specific fuel consumption by the engine (as shown in FIG. 1), while maintaining the same amount of power output from the engine. Further, the reentrant lip disposed on the peripheral wall may guide any remaining unburned portion of the reacting plumes into a squish region of the combustion chamber for completing the combustion of the remaining unburned portion of the reacting plumes. It should be noted herein that non-recessed portion 166 of the piston crown may be a portion of the squish region. In certain examples, the reentrant lip may prevent heating/burning related damages caused to combustion liners that are disposed at the circumference of the piston crown.

Figure 3:
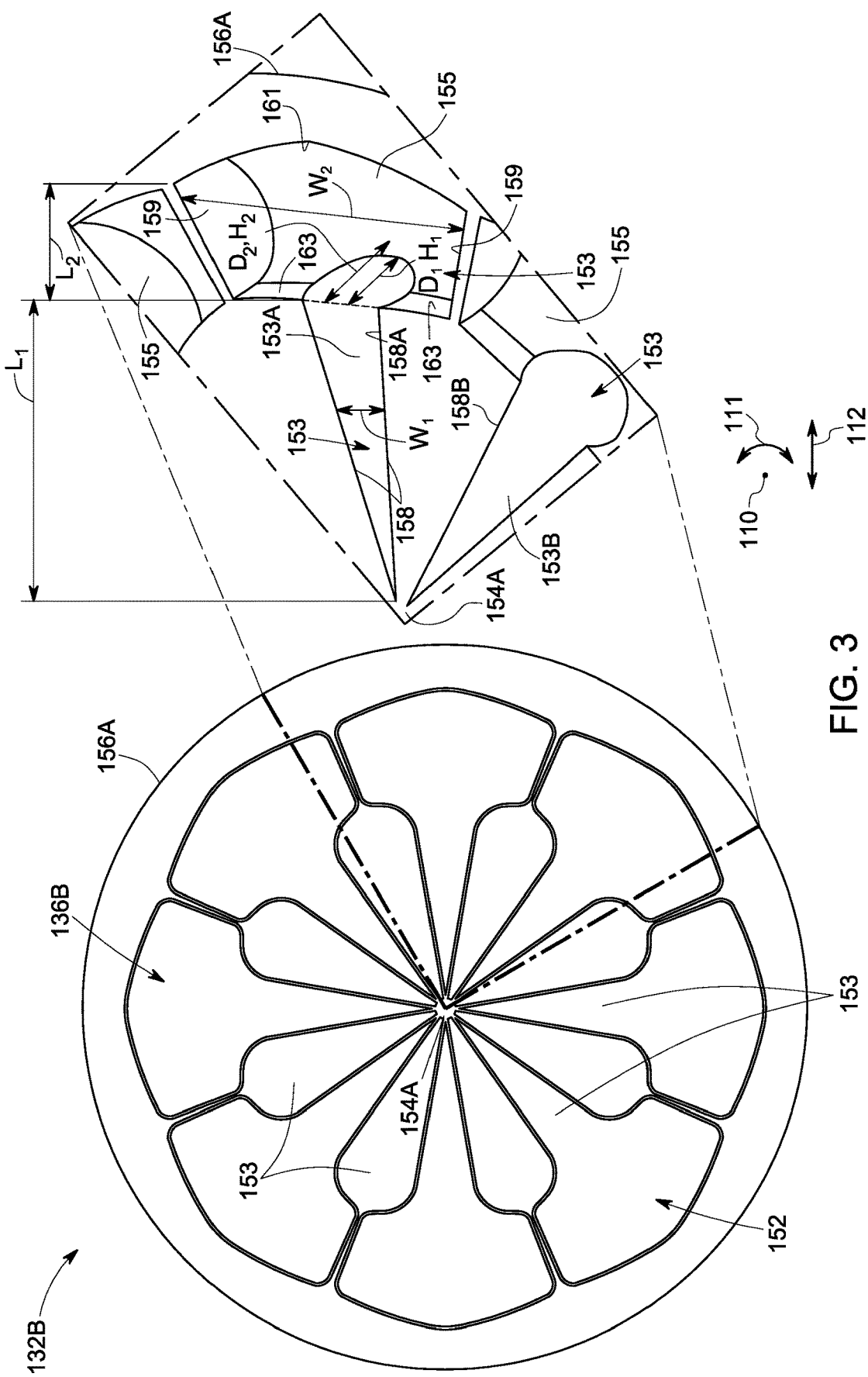
FIG. 3 illustrates an isometric view of a piston crown, in accordance with another example of the present disclosure.

FIG. 3 shows an isometric view of a piston crown 132B in accordance with another example. In one or more examples, a piston bowl 136B is formed on a top side (not labeled) of the piston crown. In some examples, the piston bowl includes a circumferential recess 152 and a plurality of first recesses 153. Each recess of the plurality of first recesses is defined by a pair of side walls 158 diverging from a center 154A of the piston crown to the circumferential recess. Similarly, the circumferential recess is defined by a peripheral wall 161 extending along a circumferential direction 111 of the piston crown and disposed proximate to the circumference, and a plurality of intermediate walls 163 spaced apart from the peripheral wall. Each wall of the plurality of intermediate walls extends between mutually opposite side walls 158A, 158B of adjacent recesses 153A, 153B of the plurality of first recesses. In the illustrated example, the pair of side walls are straight walls extending along a radial direction 112.

The piston crown is substantially similar to the piston crown discussed in the example of FIG. 2, except that the piston bowl includes a plurality of second side walls 159 disposed in the circumferential recess and spaced apart from each other along the circumferential direction to form a plurality of second recesses 155. Specifically, each wall of the plurality of second side walls extends along the radial direction between one intermediate wall of the plurality of intermediate walls and the peripheral wall. In the illustrated example, each wall of the plurality of second side walls is straight walls, which extends along the radial direction. Further, each wall of the plurality of intermediate walls may be a curved wall extending along the circumferential direction. In the illustrated example, each recess of the plurality of second recesses is connected to at least one recess of the plurality of first recesses. In such example examples, a combination of at least one recess of the plurality of first recesses and at least one recess of the plurality of second recesses are discrete recesses. Further, the piston bowl includes eight first recesses and second recesses, which divide the piston crown into eight sectors.

In one example, each recess of the plurality of first recesses has a width "$W_1$" and a depth "$D_1$." In some examples, the width "$W_1$" and the depth "$D_1$" are varied along the radial direction for an entire length "$L_1$" of each recess of the plurality of first recesses. In the example of FIG. 3, the width "$W_1$" and the depth "$D_1$" are extended from the center toward the circumference. Further, each recess of the plurality of second recesses has a width "$W_2$" and a depth "$D_2$." In some examples, the width "$W_2$" and the depth "$D_2$" are varied along the radial direction for an entire length "$L_2$" of each recess of the plurality of second recesses. In the example of FIG. 3, the width "$W_2$" and the depth "$D_2$" are extended from the plurality of first recesses toward the circumference 156A. In the example, the depth "$D_2$" of the plurality of second recesses is greater than the depth "$D_1$" of the plurality of first recesses. In one example, each wall of the pair of first side wall portions has a first height "$H_1$" and each wall of the pair of the second side wall portions has a second height "$H_2$." In the illustrated example, the first height "$H_1$" and the second height "$H_2$" and substantially same. Further, each of the first recesses is a channel like-structure having an opened-half conical shaped profile. As discussed in the example of FIG. 2, the piston bowl may further include a reentrant lip disposed on the peripheral wall.

During operation of the combustion system, a fuel injector 130 (as shown in FIG. 1) may distribute fuel based on number of the plurality of first recesses and inject the fuel into combustion chamber 140 (as shown in FIG. 1). Specifically, the fuel injector 130 may direct the fuel along the plurality of first recesses, where the fuel is initially constrained with less quantity of air for the combustion of the fuel. The constraining of the fuel for the combustion of the fuel may result in formation of a large quantity of soot (particulate matter) at substantially the same level of $NO_x$ and reduced initial HRR. Further, the fuel and/or the particulate matter (i.e., reacting plumes) are directed toward the plurality of second recesses 155, where the reacting plumes are exposed to an unutilized quantity of air for rapid combustion/oxidation of the reacting plumes to substantially complete the combustion, thereby increasing the apparent HRR. Thus, the piston crown may provide in-cylinder solutions for reducing emissions and specific fuel consumption by the engine (as shown in FIG. 1), while maintaining the same amount of power output from the engine. Further, the reentrant lip may guide any remaining unburned portion of the reacting plumes into a squish region (as discussed in FIGS. 2A and 2B) of the combustion chamber for completing the combustion of the remaining unburned portion of the reacting plumes.

Figure 4:
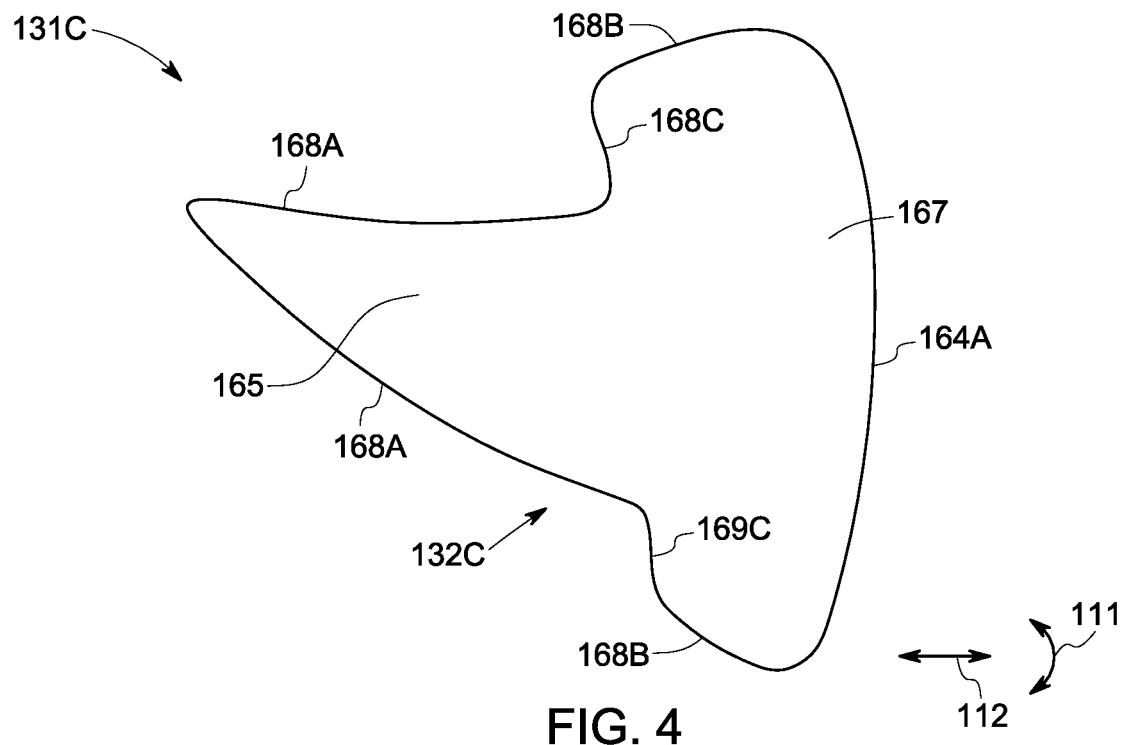
FIG. 4 illustrates a schematic diagram of a portion of a piston crown in accordance with yet another example of the present disclosure.

FIG. 4 shows a schematic diagram of a portion 131C of a piston crown 132C in accordance with yet another example. The portion includes a first recess 165 and a second recess 167. The piston crown is substantially similar to a piston crown 132B discussed in the example of FIG. 3, except that a pair of first side wall portions 168A defining the first recess is a curved side wall relative to a radial direction 112. Similarly, a plurality of second side walls 168B of the second recess is a curved side wall relative to the radial direction. Further, in the illustrated example, each of a plurality of intermediate walls 169A is a curved intermediate wall. In one example, each wall of the pair of first wall portions has different radius of curvature relative to the radial direction (e.g., relative to a straight line extending along the radial direction from a center of the piston crown).

Figure 5:
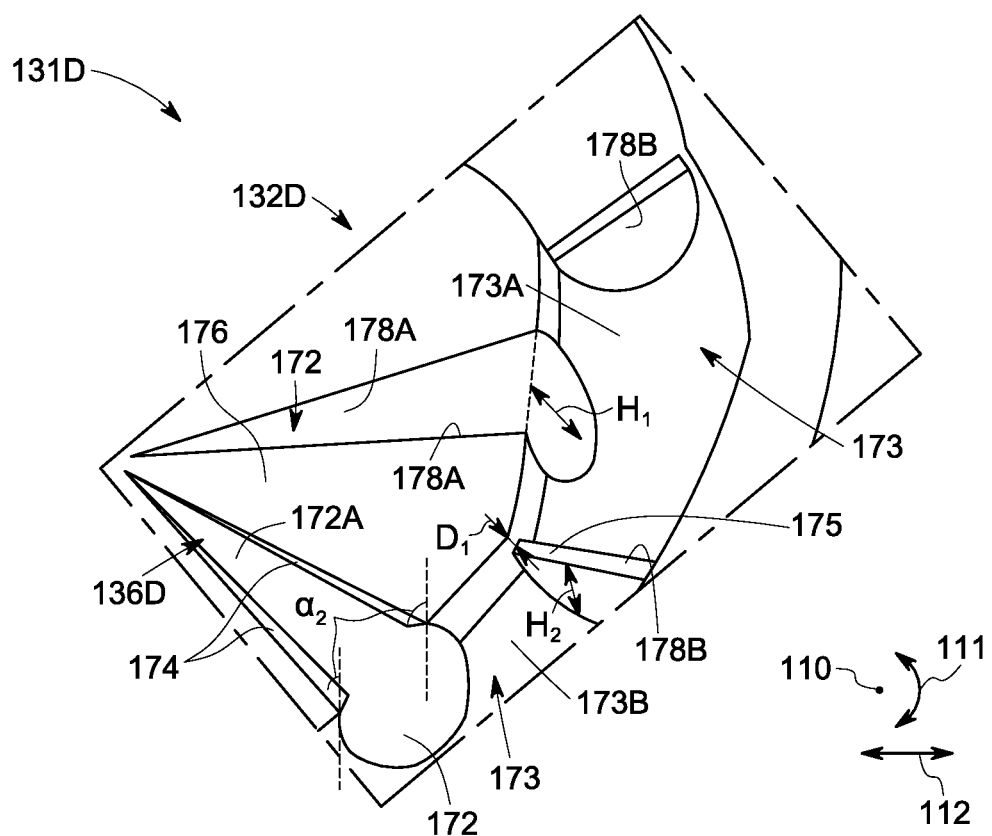
FIG. 5 illustrates an isometric view of a portion of a piston crown, in accordance with yet another example of the present disclosure.

FIG. 5 shows an isometric view of a portion 131D of a piston crown 132D in accordance with another example. The portion includes a plurality of first recesses 172 and a plurality of second recesses 173. It should be noted herein that the piston crown is substantially similar to a piston crown 132B discussed in the example of FIG. 3, except that a pair of first side wall portions 178A has a first height "$H_1$" and a pair of second side wall portions 178B has a second height "$H_2$," where the second height "$H_2$" is different from the first height "$H_1$." Specifically, the second height "$H_2$" is smaller than the first height "$H_1$." More specifically, a top side 175 (i.e., surface) of each wall of the pair of second side wall portions is offset by a distance "$D_1$" from a top side 176 (i.e., surface) of the piston crown. The pair of second side wall portions having the smaller second height "$H_2$" allows the combustion flames (or plumes) to interact between the two mutually adjacent second recesses, for example, between the second recess 173A and the second recess 173B. The piston crown further includes reentrant lips 174 disposed on the pair of first side wall portions of at least one recess, for example, the first recess 172A. In one example, each of the reentrant lips is inclined at a reentrancy angle "$\alpha_2$" relative to the longitudinal direction 110.

Figure 6A:
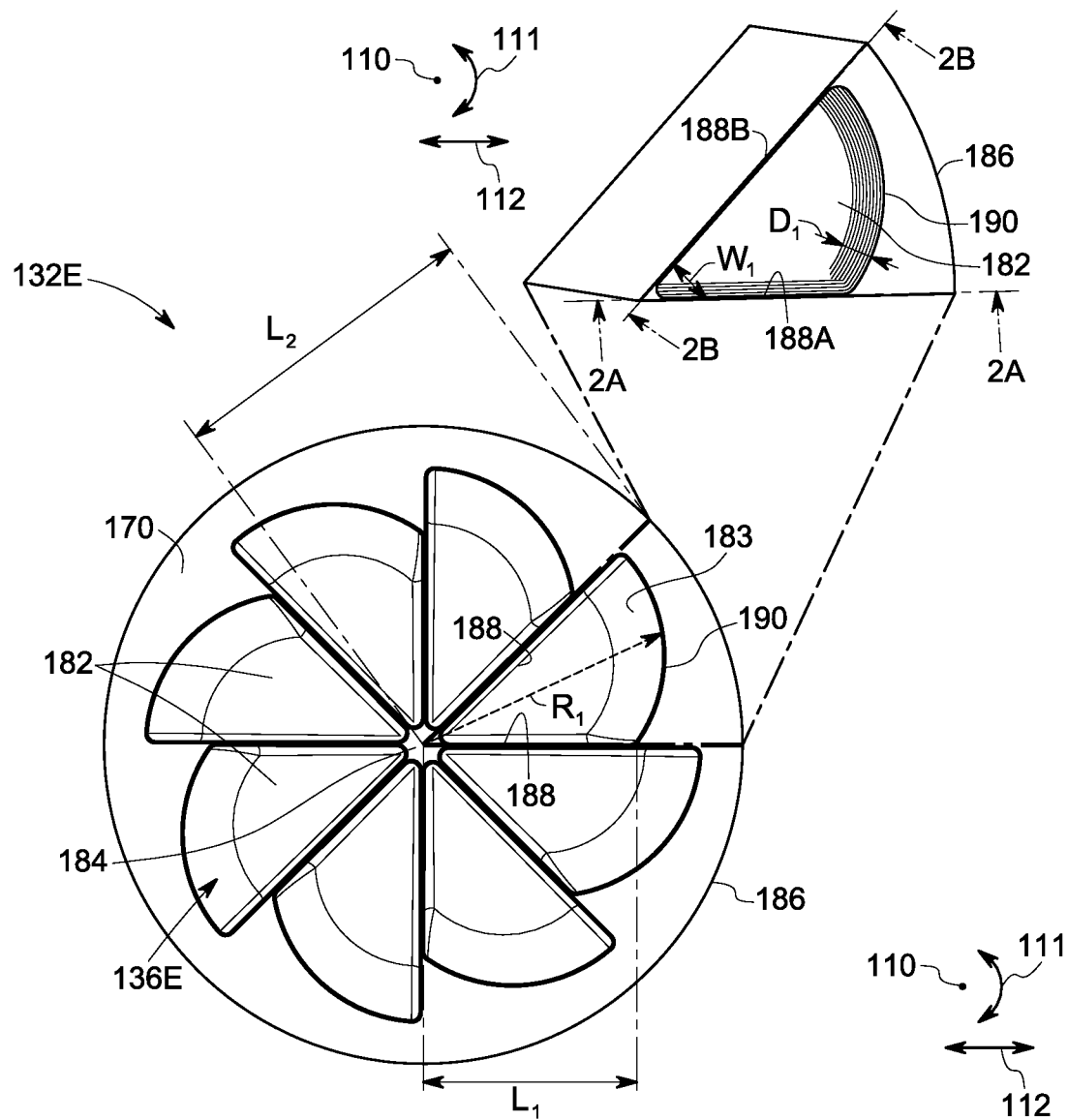
FIG. 6A illustrates an isometric view of a piston crown, in accordance with one example of the present disclosure.
Figure 6B:
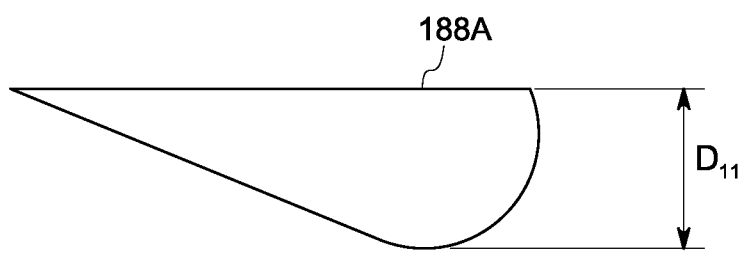
FIG. 6B illustrates a schematic diagram of one recess of a plurality of recesses taken along a line 2A-2A of FIG. 6A, in accordance with one example of the present disclosure.
Figure 6C:
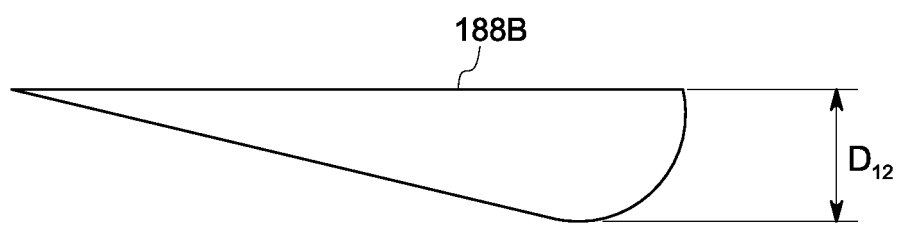
FIG. 6C illustrates a schematic diagram of one recess of a plurality of recesses taken along a line 2B-2B of FIG. 6A, in accordance with one example of the present disclosure.

FIG. 6A shows an isometric view of a piston crown 132E in accordance with one example. FIG. 6B shows a schematic diagram of one recess of a plurality of recesses 182 taken along a line 2A-2A of FIG. 6A in accordance with one example. FIG. 6C shows a schematic diagram of one recess of the plurality of recesses taken along a line 2B-2B of FIG. 6A in accordance with one example. In one or more examples, a piston bowl 136E is formed on a top side 170 of the piston crown. The piston bowl includes a plurality of recesses 182 arranged spaced apart from each other along a circumferential direction 111. Specifically, each of the recesses extends between a center 184 of the piston crown and a circumference 186 of the piston crown. In the illustrated example, the plurality of recesses includes discrete recesses.

In one example, each recess of the plurality of recesses is defined by a pair of side walls 188 diverging from the center toward the circumference of the piston crown, and a peripheral wall 190 extending between the pair of side walls proximate to the circumference. Specifically, a first side wall 188A of the pair of side walls has a first length "$L_1$" and a second side wall 188B of the pair of side walls has a second length "$L_2$." In the illustrated example, the first length "$L_1$" is smaller than the second length "$L_2$." Further, the peripheral wall connecting the first side wall 188A and the second side wall 188B of the pair of side walls is a curved wall. In one example, each recess of the plurality of recesses has varied radii "$R_1$" from the center.

In one example, each recess of the plurality of recesses has a width "$W_1$" and a depth "$D_1$," where the width "$W_1$" and the depth "$D_1$" are varied along the radial direction for an entire length "$L_1$" of each recess of the plurality of recesses. Specifically, the width "$W_1$" is gradually extended (increased) from the center till an end portion of first side wall 188A, and gradually decreased from the end portion of the first side wall till an end portion of the second side wall 188B. Similarly, the depth "$D_1$" of each recess of the plurality of recesses is extended from the center toward the circumference. Further, the depth "$D_1$" of each recess of the plurality of recesses is uniformly varied along the circumferential direction. For example, in the illustrated example, each recess of the plurality of recesses has a depth "$D_{11}$" proximate to the first side wall and has a depth "$D_{12}$" proximate to the second side wall. The depth "$D_1$" can be uniformly decreased from the first side wall 188A to the second side wall 188B along the circumferential direction. In one example, each recess of the plurality of recesses has a crest-wave shaped profile. The piston bowl may further include a reentrant lip on the first side wall 188A, the second side wall 188B, or the peripheral wall, as discussed in the examples of FIGS. 2 and 5. In the illustrated example, the first side wall and the second side wall are straight side walls extending tangentially toward the peripheral wall along the radial direction. In some examples, the first side wall and the second side wall may be curved walls or sloped side walls, which may direct plumes upwards toward a combustion chamber or a squish region.

During operation of the combustion system, the fuel injector (as shown in FIG. 1) may inject fuel into combustion chamber (as shown in FIG. 1). Specifically, the fuel injector may direct the fuel into a first region (i.e., a region parallel to the first side wall), where the fuel is initially constrained with less quantity of air for the fuel to entrain, mix and combust. The initial constraining of the fuel may lower the HRR in the early stage of the combustion, and may thus reduce $NO_x$ and soot oxidation. The peripheral wall guides the fuel and/or the particulate matter (i.e., reacting plumes) to turn almost 90 degrees. Simultaneously, the reacting plumes are directed into a second region defined around the second side wall, while rising up in a spiral path due to varied depth along the circumferential direction, into a squish region (not labeled) defined in the combustion chamber. Thus, the reacting plumes are opened-up to an unutilized quantity of air for rapid combustion/oxidation for substantial combustion of the reacting plumes, thereby increasing the apparent HRR, and reducing emissions and specific fuel consumption.

Figure 7A:
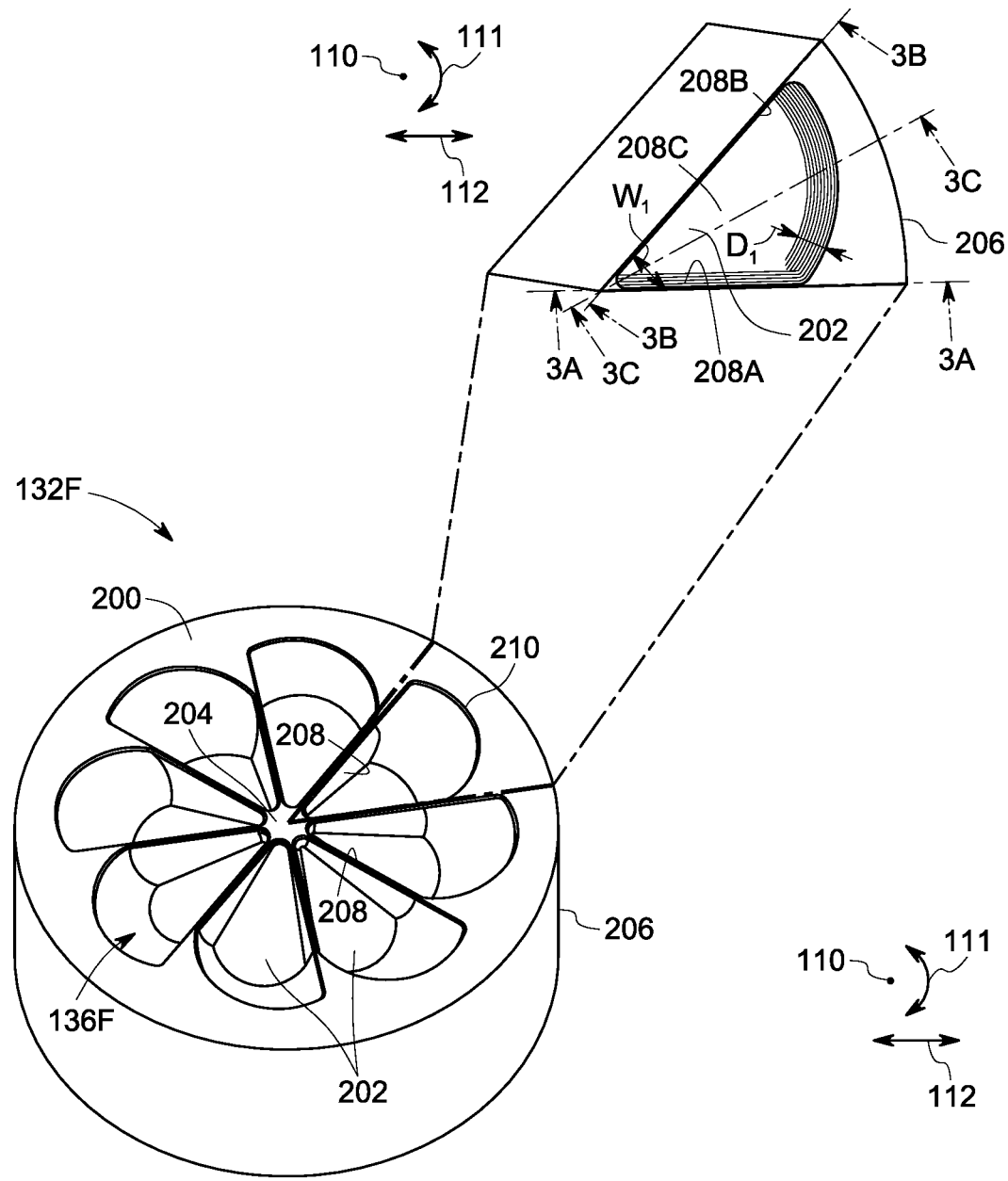
FIG. 7A illustrates an isometric view of a piston crown, in accordance with another example of the present disclosure.
Figure 7B:
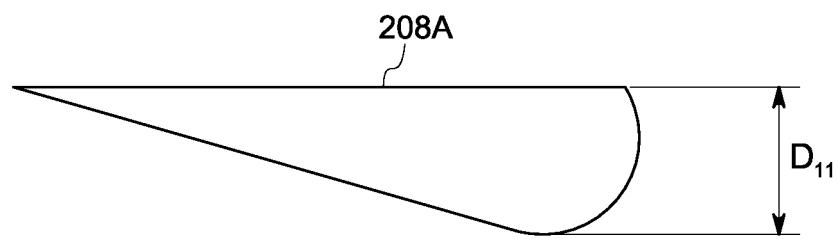
FIG. 7B illustrates a schematic diagram of one recess of a plurality of recesses taken along a line 3A-3A of FIG. 7A, in accordance with another example of the present disclosure.
Figure 7C:
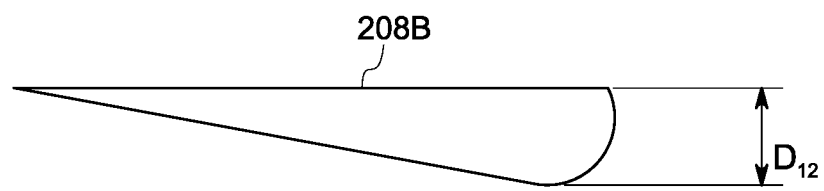
FIG. 7C illustrates a schematic diagram of one recess of a plurality of recesses taken along a line 3B-3B of FIG. 7A, in accordance with another example of the present disclosure.
Figure 7D:
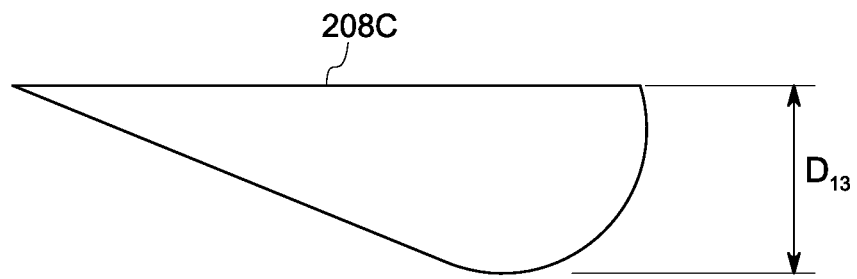
FIG. 7D illustrates a schematic diagram of one recess of a plurality of recesses taken along a line 3C-3C of FIG. 7A, in accordance with another example of the present disclosure.

FIG. 7A shows an isometric view of a piston crown 132F in accordance with another example. FIG. 7B shows a schematic diagram of one recess of a plurality of recesses 203 taken along a line 3A-3A of FIG. 7A in accordance with another example. FIG. 7C shows a schematic diagram of one recess of a plurality of recesses taken along a line 3B-3B of FIG. 7A in accordance with another example. FIG. 7D shows a schematic diagram of one recess of a plurality of recesses taken along a line 3C-3C of FIG. 7A in accordance with another example. In one or more examples, a piston bowl 136F is formed on a top side 200 of the piston crown. The piston bowl includes a plurality of recesses 202 arranged spaced apart from each other along the circumferential direction. Specifically, each recess of the plurality of recesses extends between a center 204 of the piston crown and a circumference 206 of the piston crown. In the illustrated example, the plurality of recesses are discrete recesses.

In one example, each recess of the plurality of recesses is defined by a pair of side walls 208 diverging from the center toward the circumference of the piston crown, and a peripheral wall 210 extending between the pair of side walls at the circumference.

It should be noted herein that the piston crown is substantially similar to the piston crown discussed in the example of FIG. 6A, except that a depth "$D_1$" of each recess of the plurality of recesses is i) increased (extended) from a first side wall 208A till a middle portion 208C of each recess of the plurality of recesses and ii) decreased from the middle portion till a second side wall 208B, along the circumferential direction. For example, in the illustrated example, each recess of the plurality of recesses has a depth "$D_{11}$" proximate to the first wall, a depth "$D_{12}$" proximate to the second wall, and depth "$D_{13}$" proximate to the middle portion. In one example, each recess of the plurality of recesses has a crest-wave shaped profile. The piston bowl may further include a reentrant lip on the first side wall, the second side wall, or the peripheral wall, as discussed in the examples of FIGS. 2 and 5. Similar to the example of FIG. 6A, each recess of the plurality of recesses having varied depth along the circumferential direction may aid in spreading the combusting flame as the reacting plumes reaches from the first side wall to the second side wall. Accordingly, the piston crown may provide in-cylinder solutions for reducing emissions and specific fuel consumption by the engine, while maintaining the same amount of power output from the engine.

Figure 8A:
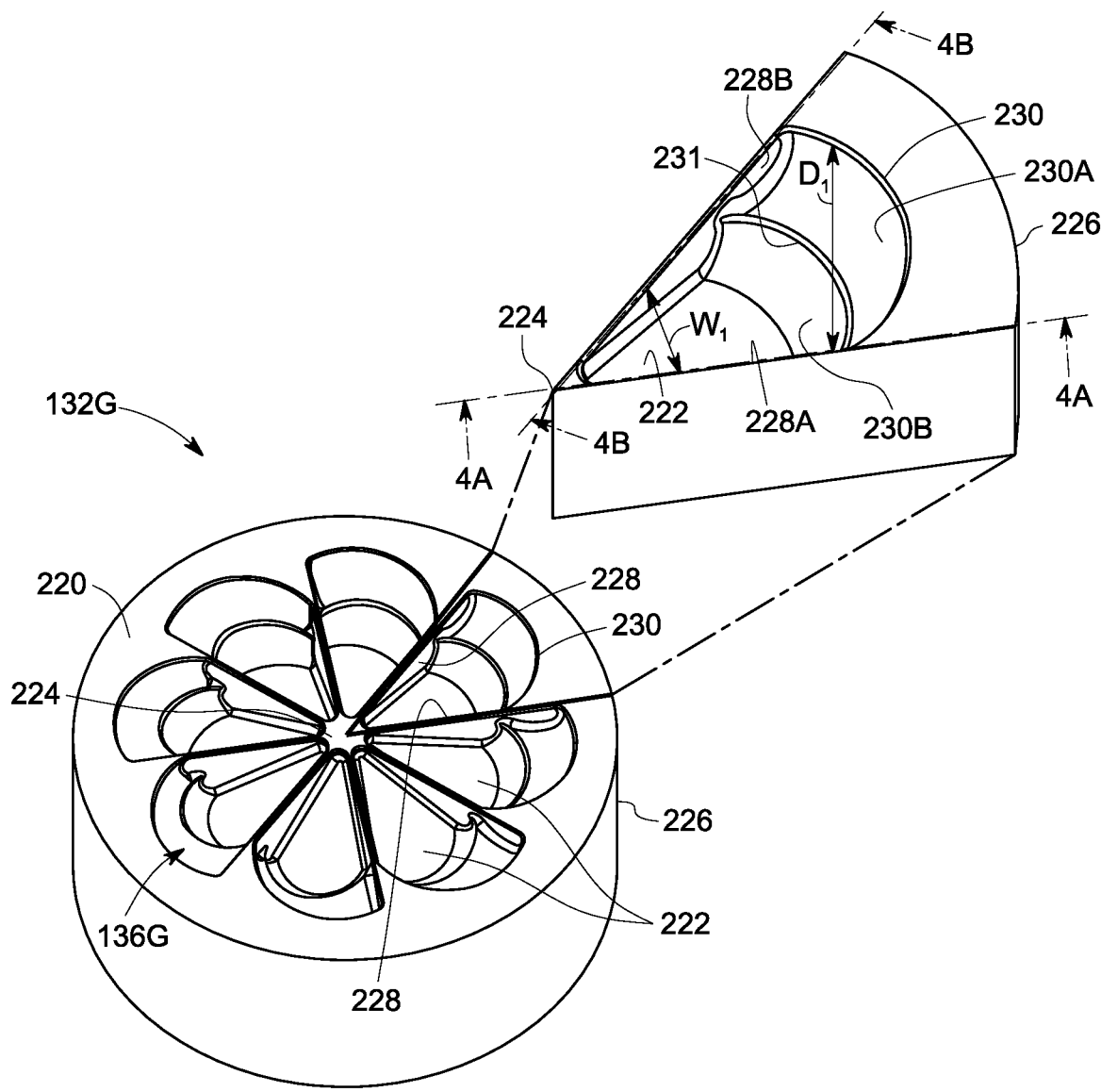
FIG. 8A illustrates an isometric view of a piston crown, in accordance with yet another example of the present disclosure.
Figure 8B:
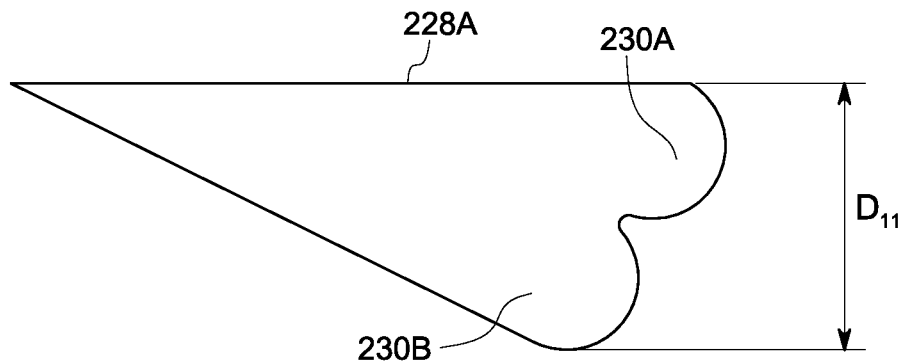
FIG. 8B illustrates a schematic diagram of one recess of a plurality of recesses taken along a line 4A-4A of FIG. 8A, in accordance with yet another example of the present disclosure.
Figure 8C:
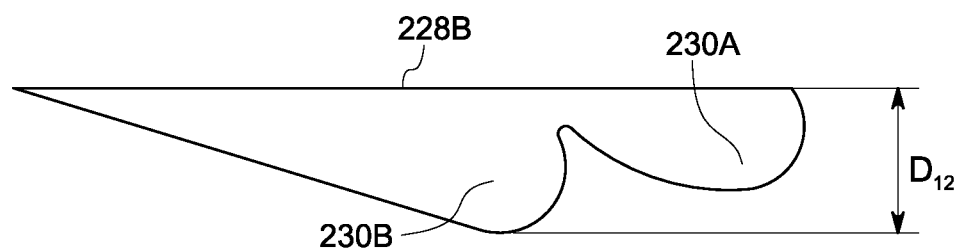
FIG. 8C illustrates a schematic diagram of one recess of a plurality of recesses taken along a line 4B-4B of FIG. 8A, in accordance with yet another example of the present disclosure.

FIG. 8A shows an isometric view of a piston crown 132G in accordance with yet another example of the present disclosure. FIG. 8B shows a schematic diagram of one recess of a plurality of recesses 222 taken along a line 4A-4A of FIG. 8A in accordance with yet another example. FIG. 8C shows a schematic diagram of one recess of a plurality of recesses 222 taken along a line 4B-4B of FIG. 8A in accordance with yet another example. In one or more examples, a piston bowl 136G is formed on a top side 220 of the piston crown. The piston bowl includes a plurality of recesses 222 arranged spaced apart from each other along the circumferential direction. Specifically, each recess of the plurality of recesses extends between a center 224 of the piston crown and a circumference 226 of the piston crown. In the illustrated example, the plurality of recesses are discrete recesses.

In one example, each recess of the plurality of recesses is defined by a pair of side walls 228 diverging from the center toward the circumference of the piston crown, and a peripheral wall 230 extending between the pair of side walls proximate to the circumference.

It should be noted herein that the piston crown is substantially similar to the piston crown discussed in the example of FIG. 6A, except that the peripheral wall has a stepped peripheral wall 231 to form into two pockets, for example, a first pocket 230A and a second pocket 230B, along a length of the peripheral wall. Similar to the example of FIG. 6A, each recess of the plurality of recesses having the stepped peripheral wall may aid in splitting the reacting plumes into multiple jets, where each jet has its own trajectory which spirals within and above/outside the first pocket and the second pocket. Thereby, directing the reacting plumes to regions of unburned air for increasing the HRR and lowering the $NO_x$, specific fuel consumption (SFC), and particulate matter (soot) while substantially completing the combustion of the fuel.

Figure 9:
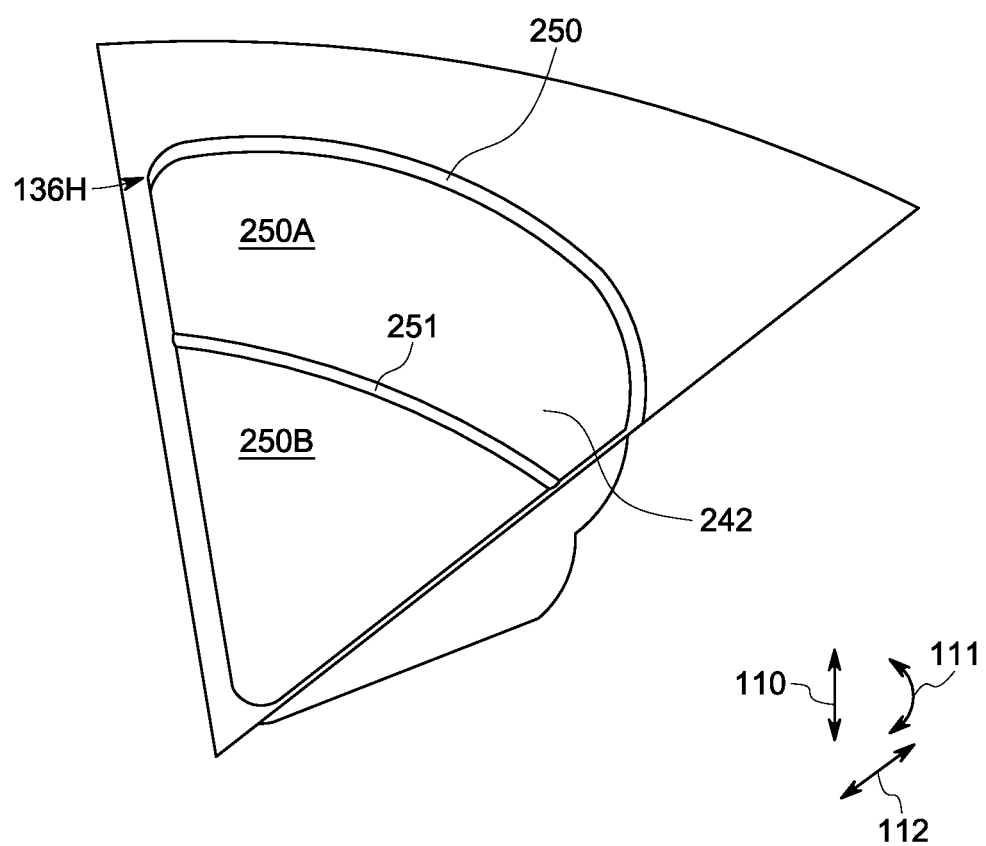
FIG. 9 illustrates an isometric view of a recess of a piston bowl, in accordance with yet another example of the present disclosure.

FIG. 9 shows an isometric view of a recess of a plurality of recesses 242 formed in a piston bowl 136H in accordance with yet another example. It should be noted herein that the recess are substantially similar to each recess of the plurality of recesses discussed in the example of FIG. 7A, except that a peripheral wall 250 of the recess has a stepped wall 251 to form into two pockets 250A and 250B along a length of the peripheral wall. Similar, to the example of FIG. 7A, the piston bowl may provide in-cylinder solutions for reducing emissions and specific fuel consumption by the engine, while maintaining the same amount of power output from the engine.

Figure 10:
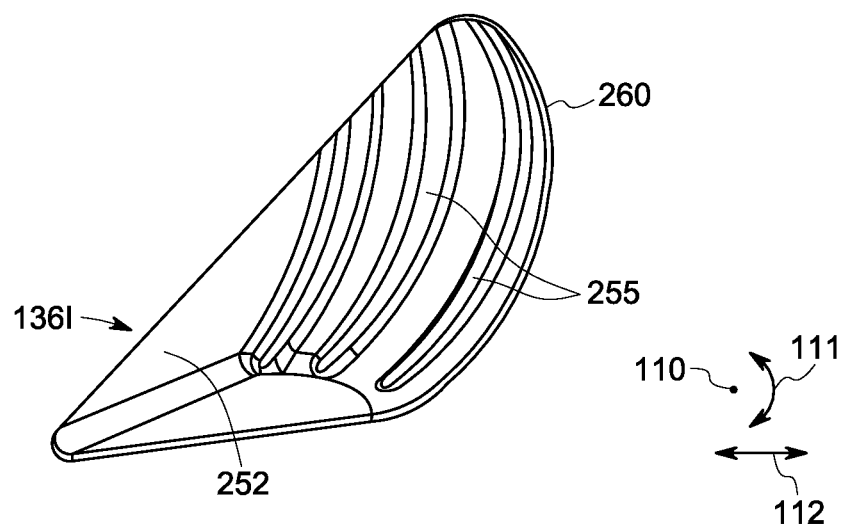
FIG. 10 illustrates an isometric view of a recess of a piston bowl, in accordance with yet another example of the present disclosure.

FIG. 10 shows an isometric view of a recess 252 formed in a piston bowl 136I in accordance with yet another example. It should be noted herein that the one recess is substantially similar to each recess of a plurality of recesses discussed in the example of FIG. 6A, except that a peripheral wall 260 of the recess 252 includes a plurality of ridges 255 extending along a circumferential direction 111 and disposed facing a center of a piston crown. In one example, the plurality of ridges is spaced apart from each other and extends in-parallel to one another along the circumferential direction. Similar to the example of FIG. 6A, the piston bowl may provide in-cylinder solutions for reducing emissions and specific fuel consumption by the engine, while maintaining the same amount of power output from the engine.

Figure 11:
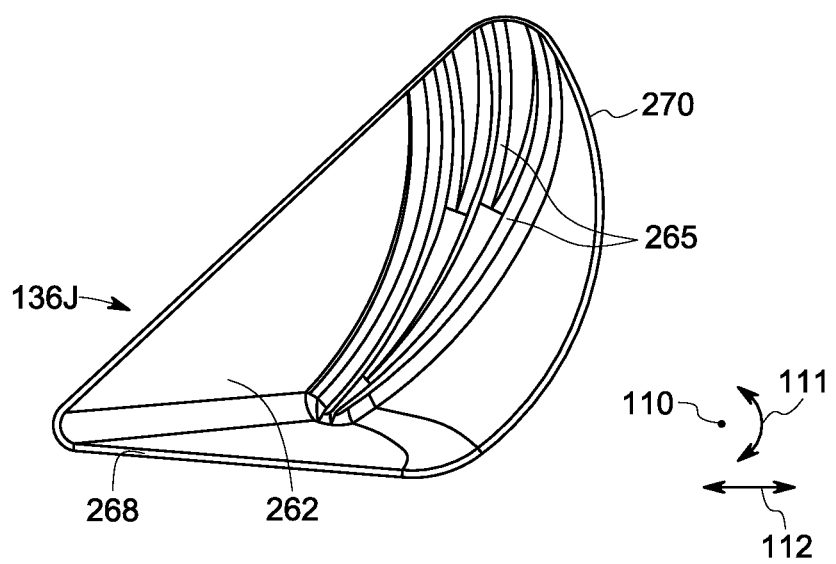
FIG. 11 illustrates an isometric view of a recess of a piston bowl, in accordance with yet another example of the present disclosure.

FIG. 11 shows an isometric view of a recess 262 formed in a piston bowl 136J in accordance with yet another example. It should be noted herein that the recess is substantially similar to each recess of a plurality of recesses discussed in the example of FIG. 6A, except that a peripheral wall 270 of the recess 262 includes a plurality of ridges 265 extending disposed facing a center of a piston crown. In one example, the plurality of ridges extend along the circumferential direction and converge toward an end portion of one side wall of the pair of side walls, for example, a first side wall 268 of the recess. Similar, to the example of FIG. 6A, the piston bowl may provide in-cylinder solutions for reducing emissions and specific fuel consumption by the engine, while maintaining the same amount of power output from the engine.

Figure 12:
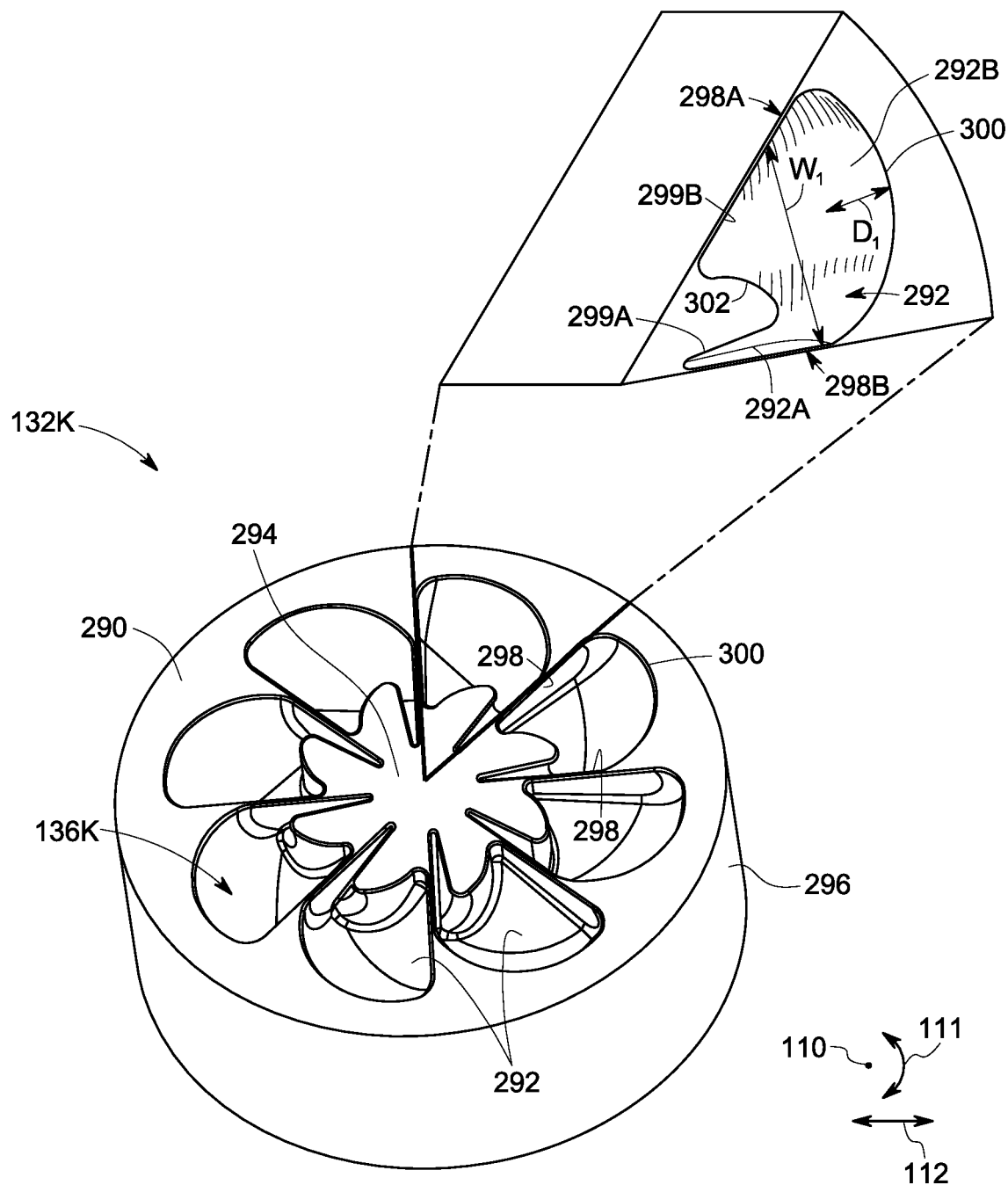
FIG. 12 illustrates an isometric view of a piston crown, in accordance with yet another example of the present disclosure.

FIG. 12 shows an isometric view of a piston crown 132K in accordance with yet another example. In one or more examples, a piston bowl 136K is formed on a top side 290 of the piston crown. The piston bowl includes a plurality of recesses 292 arranged spaced apart from each other along a circumferential direction 111. Specifically, each of the recesses extends between a center 294 of the piston crown 132K and a circumference 296 of the piston crown. In the illustrated example, the plurality of recesses are discrete recesses.

In one example, each recess of the plurality of recesses is defined by a pair of side walls 298 diverging from the center toward the circumference of the piston crown, and a peripheral wall 300 extending between the pair of side walls proximate to the circumference. In the illustrated example, the pair of side walls includes a first side wall 298A and a second side wall 298B. In such example, at least one wall of the pair of side walls includes two portions, for example, the first side wall includes a first portion 299A and a second portion 299B. The piston bowl further includes a curved intermediate wall 302. In such examples, the first portion is connected to the second portion via the curved intermediate wall. Further, each recess of the plurality of recesses includes a first recess portion 292A and a second recess portion 292B. The first recess portion is defined by a portion of the second side wall and the first portion. Similarly, the second recess portion is defined by a remaining portion of the second side wall, the curved intermediate wall, and the second portion. As discussed in the example of FIG. 6A, each recess of the plurality of recesses has a width "$W_1$" and a depth "$D_1$." In one example, the width "$W_1$" and the depth "$D_1$" are varied along the radial direction for an entire length of each recess of the plurality of recesses.

During operation of the combustion system, the fuel injector (as shown in FIG. 1) may inject fuel into the combustion chamber (as shown in FIG. 1). Specifically, the fuel injector may direct the fuel into the first recess portion, where the fuel is initially constrained with less quantity of air for the fuel to entrain, mix and combust (as shown in FIG. 1). The initial constraining of the fuel may lower the HRR in the early stage of the combustion, and may thus reduce $NO_x$ and reduce soot oxidation. Further, the fuel and/or the particulate matter (i.e., reacting plumes) are directed toward the second recess portion, where the reacting plumes are exposed to an unutilized quantity of air for rapid combustion/oxidation of the reacting plumes for substantial combustion of the reacting plumes, thereby increasing the apparent heat release rate. Thus, the piston crown may provide in-cylinder solutions for reducing emission and specific fuel consumption by the engine, while maintaining the same amount of power output from the engine.

Figure 13:
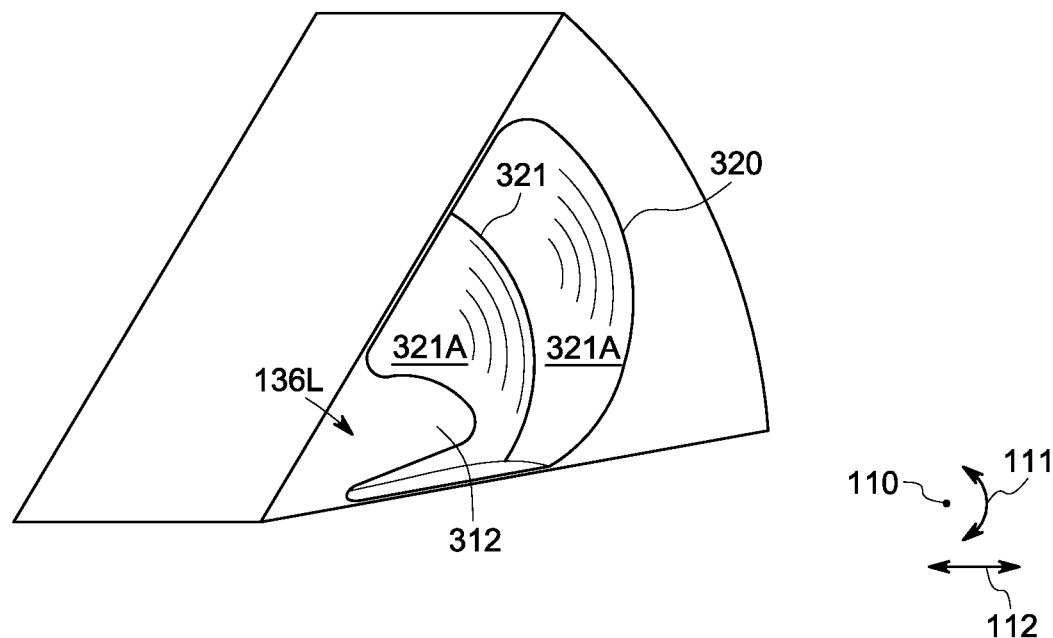
FIG. 13 illustrates an isometric view of a recess of a piston bowl, in accordance with yet another example of the present disclosure.

FIG. 13 shows an isometric view of a recess of a plurality of recesses 312 formed in a piston crown 132L in accordance with yet another example. It should be noted herein that this piston crown is substantially similar to the piston crown discussed in the example of FIG. 12, except that a peripheral wall 320 has a stepped peripheral wall 321 to form two pockets 321A and 321B along the entire length of the peripheral wall. Similar to the example of FIG. 12, the piston bowl may provide in-cylinder solutions for reducing emissions and specific fuel consumption by the engine, while maintaining the same amount of power output from the engine.

Figure 14:
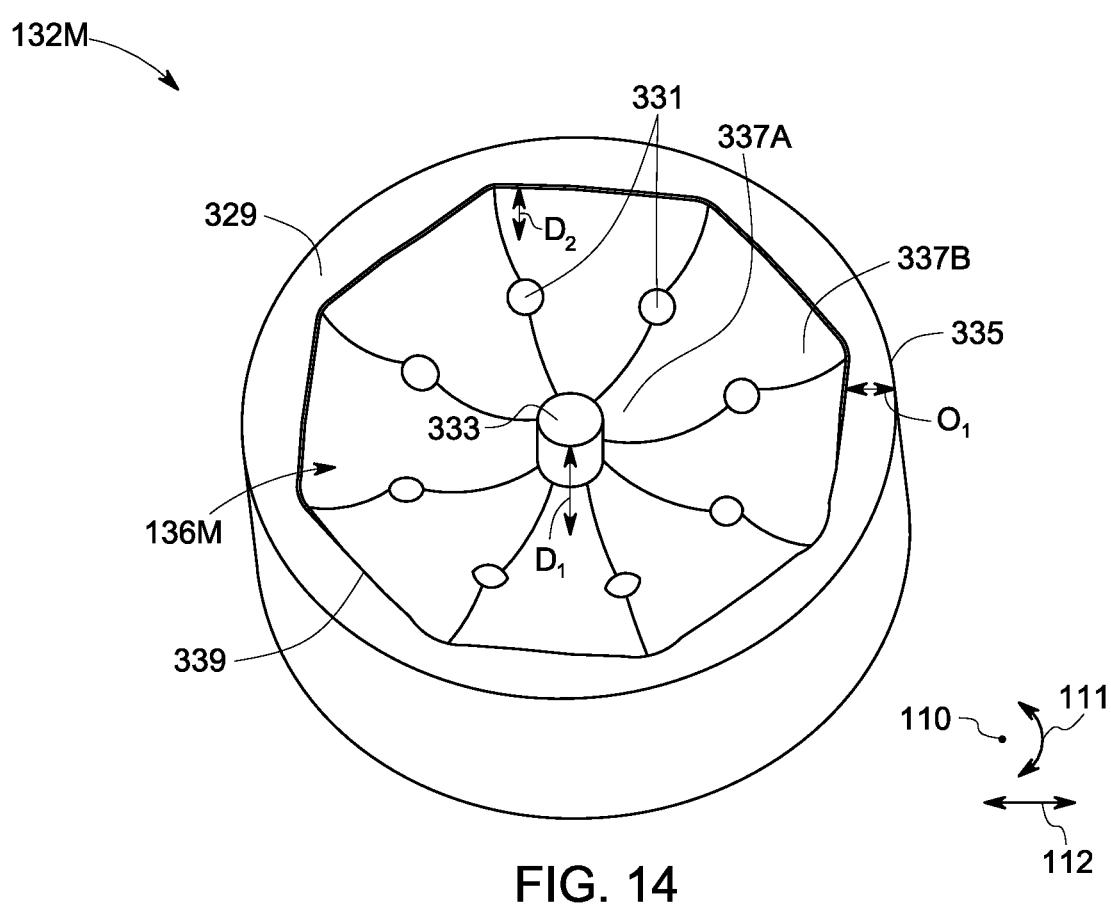
FIG. 14 illustrates an isometric view of a piston crown, in accordance with one example of the present disclosure.

FIG. 14 shows an isometric view of a piston crown 132M in accordance with one example. In one or more examples, the piston crown includes a piston bowl 136M formed on a top side 329 of the piston crown. The piston bowl includes vanes or protrusions 331 arranged spaced apart from each other along a circumferential direction 111. Each of the vanes or protrusions is disposed between a center 333 and a peripheral wall 339 of the piston crown. Specifically, each of the vanes or protrusions is arranged substantially in a middle of the piston bowl and faces the center of the piston crown. It should be noted herein that the term "substantially in a middle" refers to about 30 percent to 80 percent of a length of the piston bowl, extending radially between the center and the peripheral wall. In the illustrated example, the peripheral wall is located proximate to a circumference 335 of the piston crown and extends 360 degrees on the top side of the piston crown. Additionally, the peripheral wall is offset from the circumference by a radial distance "01." Further, at least one of the vanes or protrusions has a spherical shaped dome structure and a radius of the spherical shaped dome structure is greater than 1.5 mm. The plurality of vanes or protrusions bifurcates the piston bowl into two sections, for example, a first section 337A and a second section 337B, where the first section has a gradually extended depth "$D_1$" from the center till the plurality of vanes or protrusions, and the second section has a gradually decreased depth "$D_2$" from the plurality of vanes or protrusions up to the peripheral wall of the piston bowl.

During operation of the combustion system, the fuel injector (as shown in FIG. 1) may inject fuel into combustion chamber (as shown in FIG. 1). Specifically, the fuel injector 13 may direct the fuel toward each of the vanes or protrusions, where the fuel is initially constrained with less quantity of air for the fuel to entrain, mix and combust in the cylinder (as shown in FIG. 1). The initial constraining of the fuel may lower the HRR in the early stage of the combustion, and may thus reduce $NO_x$ and reduce soot oxidation. Further, each of the vanes or protrusions splits the fuel and/or the particulate matter (i.e., reacting plumes), for example, into at least two portions and guide the one portion into the first section and direct another portion into the second section. Thus, the reacting plumes are exposed to an unutilized quantity of air for rapid combustion/oxidation to substantially complete the combustion, thereby increase the apparent HRR, and reduce emissions and specific fuel consumption by the engine.

Figure 15A:
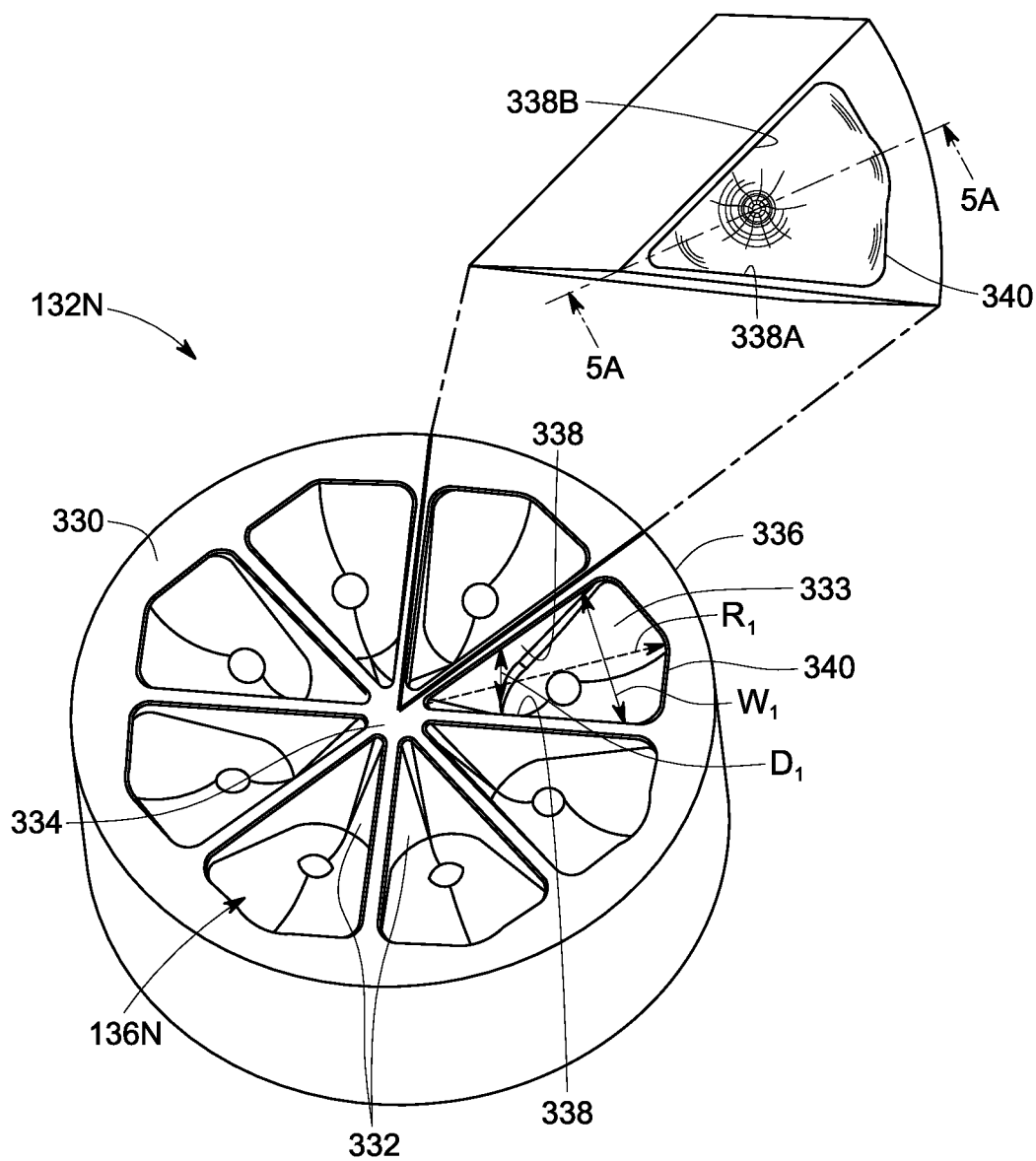
FIG. 15A illustrates an isometric view of a piston crown, in accordance with another example of the present disclosure.
Figure 15B:
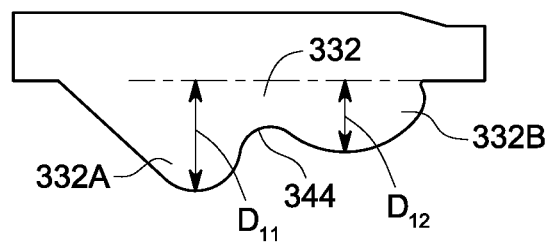
FIG. 15B illustrates a schematic diagram of one recess of a plurality of recesses taken along a line 5A-5A of FIG. 15A, in accordance with another example of the present disclosure.

FIG. 15A shows an isometric view of a piston crown 132N in accordance with another example. FIG. 15B shows a schematic diagram of one recess of a plurality of recesses 332 taken along a line 5A-5A of FIG. 15A in accordance with another example. In one or more examples, the piston crown includes a piston bowl 136N formed on a top side 330 of the piston crown. It should be noted herein that the piston bowl is substantially similar to a piston bowl discussed in the example of FIG. 14, except that the piston bowl includes a plurality of recesses 332. Specifically, the piston bowl 136N includes the plurality of recesses arranged spaced apart from each other along a circumferential direction 111. Where, each of the recesses extends between a center 334 of the piston crown and a circumference 336 of the piston crown. In the illustrated example, the recesses are discrete recesses. Further, the piston bowl includes a plurality of vanes or protrusions 344, where at least one vane or protrusion of the plurality of vanes or protrusions is disposed in a recess of the plurality of recesses. In the illustrated example, the recesses are discrete recesses.

In the illustrated example of FIG. 15B, each of the vanes or protrusions is located at a mid-region of each recess of the plurality of recesses, facing the center of the piston crown. Each of the vanes or protrusions bifurcates the recess of the plurality of recesses into two cup-shaped recess sections, for example, a first section 332A and a second section 332B.

In one example, each recess of the plurality of recesses is defined by a pair of side walls 338 diverging from the center toward the circumference of the piston crown, and a portion of a peripheral wall 340 extending between the pair of side walls and located proximate to the circumference. In one example, each recess of the plurality of recesses has varied radii "$R_1$" from the center. Further, each recess of the plurality of recesses has a width "$W_1$" and a depth "$D_1$." In one example, the width "$W_1$" and the depth "$D_1$" are varied along the radial direction for an entire length of each recess of the plurality of recesses. Specifically, a depth "$D_{11}$" of each recess of the plurality of recesses in the first section is gradually extended from the center till the vane or protrusion of the plurality of vanes or protrusions, and a depth "$D_{12}$" of each recess of the plurality of recesses in the second section is gradually decreased from the vane or protrusion of the plurality of vanes or protrusions till the peripheral wall. Further, the depth "$D_{11}$" of the first section is greater than the depth "$D_{12}$" of the second section. Similarly, the width "$W_1$" of each recess of the plurality of recesses is extended from the center toward the circumference.

During operation of the combustion system, the fuel injector (as shown in FIG. 1) may inject fuel into combustion chamber (as shown in FIG. 1). Specifically, the fuel injector may direct the fuel toward each of the vanes or protrusions, where the fuel is initially constrained with less quantity of air for the fuel to entrain, mix and combust in the cylinder (as shown in FIG. 1). The initial constraining of the fuel may lower the HRR in the early stage of the combustion, and may thus reduce $NO_x$ and reduce soot oxidation. Further, each of the vanes or protrusions splits the fuel and/or the particulate matter (i.e., reacting plumes), for example, into at least two portions and guide the one portion into the first section and direct another portion into the second section. Thus, the reacting plumes are exposed to an unutilized quantity of air for rapid combustion/oxidation to substantially complete the combustion, thereby increase the apparent HRR, and reduce emissions and specific fuel consumption by the engine.

Figure 16:
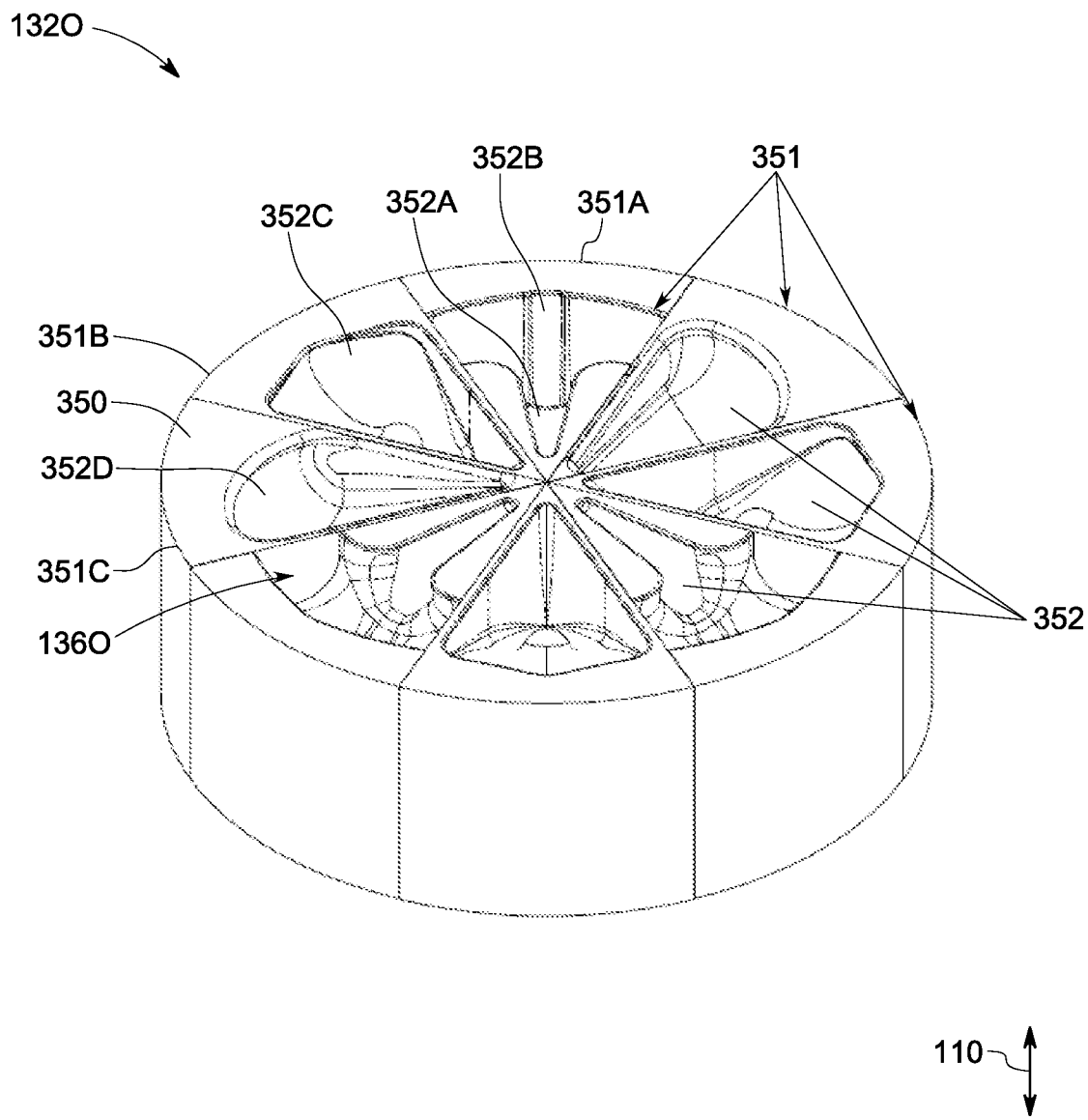
FIG. 16 illustrates an isometric view of a piston crown, in accordance with one example of the present disclosure.

FIG. 16 shows an isometric view of a piston crown 132O in accordance with yet another example. In the illustrated example, a piston bowl 136O is formed on a top side 350 of the piston crown. Further, the piston bowl includes sectors 351 arranged spaced apart from each other along a circumferential direction 111. In such example examples, one sector 351A of the sectors includes a first recess 352A and a second recess 352B, which is substantially similar to a first recess and a second recess, as discussed in the example of FIG. 3. Similarly, another sector 351B adjacent to the sector 351A includes one recess 352C, which is substantially similar to a recess 332 discussed in the example of FIG. 15A. Further, yet another sector 351C adjacent to the sectors 351B includes a recess 352D, which is substantially similar to a recess 182 discussed in the example of FIG. 6A. In one example, the combination of first recess 352A and the second recess 352B, the recess 352C, and the recess 352D are arranged adjacent to one another along the circumferential direction. Similar, to the examples of FIGS. 2A, 2B, 3-5, 6A, 7A, 8A, 9-14, 15A, and 15B, the piston bowl may provide in-cylinder solutions for reducing emissions and specific fuel consumption by the engine, while maintaining the same amount of power output from the engine. In some other examples, the piston crown may have one pattern of different recesses disposed adjacent to one another. The design of each recess of the recesses may be different than the design of the recesses adjacent to it. While the piston crown having an exemplary pattern of different recesses has been shown in the example of FIG. 15, another piston crown may include another pattern (i.e., combinations of performance-enhancing recesses), which may yield similar benefits to the piston crown.

Figure 17:
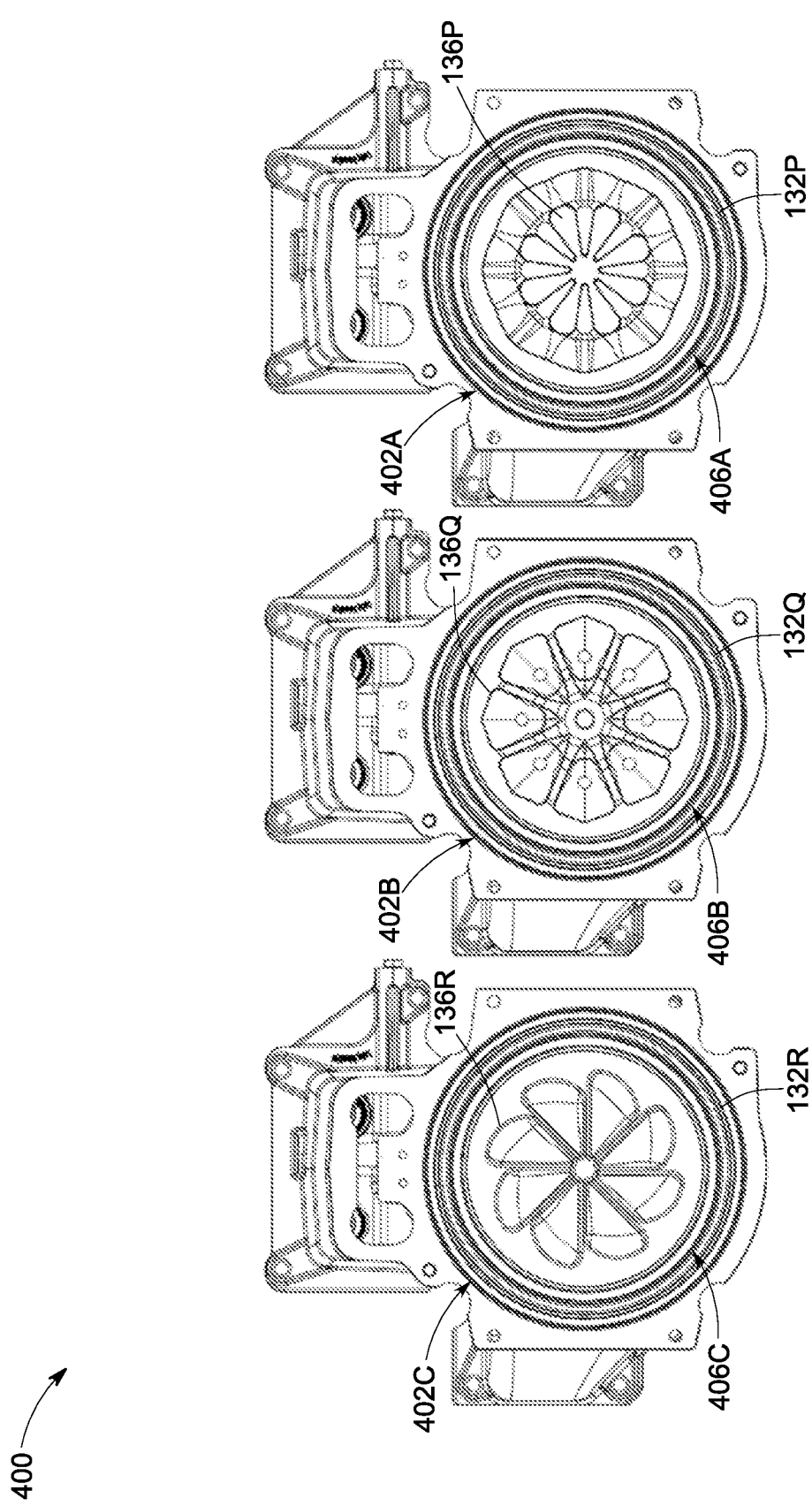
FIG. 17 illustrates a schematic diagram of a portion of a combustion system, in accordance with one example of the present disclosure.

FIG. 17 shows a schematic diagram of a portion of a combustion system 400 in accordance with another example. The combustion system is substantially similar to a combustion system discussed in the example of FIG. 1, except that the combustion system 400 includes three cylinders, for example, a first cylinder 402A, a second cylinder 402B, and a third cylinder 402C, and three pistons, for example, a first piston 406A, a second piston 406B, and a third piston 406C. Each of the three cylinders may receive a corresponding piston of the three pistons. Further, each of the three pistons includes a piston crown, for example, the first piston includes a first piston crown 132P, the second piston includes a second piston crown 132Q, and the third piston includes a third piston crown 132R. It should be noted herein that the first piston crown is substantially similar to the piston crown discussed in the example of FIG. 3, the second piston crown is substantially similar to the piston crown discussed in the example of FIGS. 15A and 15B, and the third piston crown is substantially similar to the piston crown discussed in the example of FIGS. 6A, 6B, and 6C. Similar to the examples of FIGS. 2A, 2B, 3-5, 6A, 7A, 8A, 9-14, 15A, 15B, and 16, the first, second, and third piston bowls respectively may provide in-cylinder solutions for reducing emissions and specific fuel consumption by the engine, while maintaining the same amount of power output from the engine.

Figure 18:
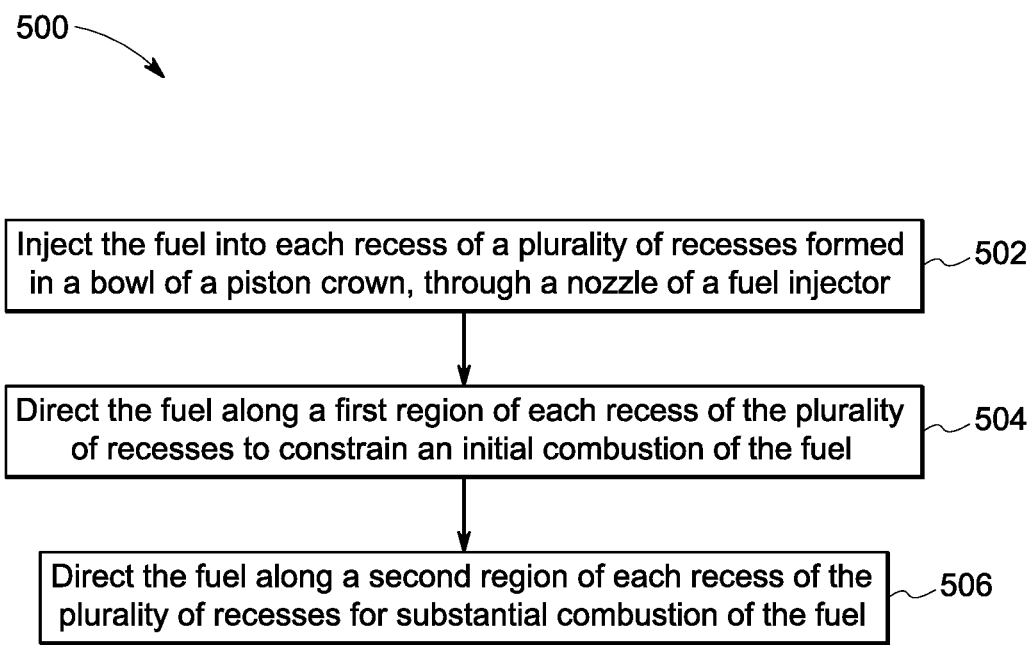
FIG. 18 is a flow chart illustrating a method of controlling a combustion of a fuel in a combustion system, in accordance with one example of the present disclosure.

FIG. 18 is a flow chart illustrating a method 500 of controlling a combustion of fuel in a combustion system in accordance with one example. The method involves a step 502 of injecting the fuel into one recess of a plurality of recesses formed in a piston bowl of a piston crown, through a fuel nozzle of a fuel injector. As discussed in the examples of FIGS. 2A, 2B, 3-5, 6A, 7A, 8A, 9-14, 15A, 15B, and 16-17, the recesses are arranged spaced apart from each other along a circumferential direction, and a width and a depth of each recess of the plurality of recesses are extended along a radial direction for an entire length of the at least one recess.

The method further involves a step 504 of directing the fuel along a first region of each recess of the plurality of recesses to constrain an initial combustion of the fuel. The step 504 of directing the fuel along the first region includes directing the fuel along a first recess as discussed in the example of FIGS. 2A, 2B, 3-5, and 15-16 or along at least one wall of a pair of side walls of each recess, as discussed in the examples of FIGS. 6A, 7A, 8A, 9-13 and 15-16 or toward a plurality of vanes or protrusions as discussed in the examples of FIGS. 14, 15A, 15B, and 16-17. In the step 504, the fuel is initially constrained with less quantity of air to entrain, mix, and combust. Thus, resulting in lowering the HRR in the early stage of the combustion, and reducing $NO_x$ and reducing soot (particulate matter) oxidation.

Further, the method involves a step 506 of directing the fuel along the second region of each recess of the plurality of recesses for substantial combustion of the fuel. The step 506 of directing the fuel along the second region includes guiding the fuel and/or the particulate matter (i.e., reacting plumes) toward a circumferential recess, as discussed in the examples of FIGS. 2A and 2B, or toward a second recess as discussed in the examples of FIGS. 3-5 and 15-16 or guiding the reacting plumes i) from the first wall toward a second wall of each recess of the plurality of recesses or ii) toward a stepped peripheral wall or iii) toward a plurality of ridges formed on a peripheral wall, as discussed in the examples of FIGS. 6-13 and 15-16 or guiding another portion of the reacting plumes into a first section defined by each of the vanes or protrusions and a second section defined by each of the vanes or protrusions, as discussed in the examples of FIGS. 14-16. The step 506 of guiding the reacting plumes into the second region may result in utilizing the unutilized quantity of air for rapid combustion/oxidation of reacting plumes to substantially complete the combustion. Thus, increasing the apparent HRR and reducing emissions ($NO_x$ and/or particulate matter) and specific fuel consumption of the engine.

In certain examples, the method may additionally involve a step of guiding a remaining portion of the fuel (i.e., reacting plumes) into a squish region of the combustion chamber using a reentrant lip for combustion of the remaining portion of the fuel.

In accordance with certain examples discussed herein, an exemplary piston crown discussed herein may provide in-cylinder solutions for controlling combustion of fuel to notably reduce soot (particulate emissions). Further, the various designs of the piston crown as discussed in the examples of FIGS. 2A, 2B, 3-5, 6A, 7A, 8A, 9-14, 15A, 15B, and 16-17 may control combustion of the fuel, thereby regulate emissions, and improve fuel efficiency of an engine. Further, the piston crown may be detachably coupled to a piston skirt, thereby allow an option to retrofit the piston crown to a piston. A combustion system using such piston bowl may not require an exhaust aftertreatment device for treatment of emissions, thereby reducing the packaging challenges, potential reliability issues associated with the aftertreatment device, and also reducing the cost and complexity of the system.

As described herein, the vanes or protrusions may change directions of the fuel and/or gas (e.g., air, recirculated exhaust, or another gas) as the fuel and/or gas flows through or around the vanes or protrusions. For example, the vanes or protrusions may be shaped and/or positioned to receive streams of the fuel and/or gas along one or more first directions and change the flow of the fuel and/or gas into one or more different second directions. The change in direction may create a swirl or circulating motion of the fuel and/or gas as the fuel and/or gas exits or passes the vanes or protrusions.

The vanes may be hollow such that the vanes define conduits or pathways for the flow of fuel and/or gases. The conduits or pathways may be open at each end to allow for fuel and/or gases to flow therethrough. In one example, the open ends of the vanes may have an arch edge combined with a flat or linear edge.

One or more of the vanes may be aligned with the fuel injector and/or exhaust valve. For example, one or more of the vanes and one or more of the holes of the fuel injector may be disposed along a common or same line. One or more of the vanes may be disposed along a common or same line as the exhaust valve. Aligning the vanes with the fuel injector holes and/or the exhaust valve can ensure that fuel and/or gases are received along the paths that the fuel and/or gases are directed into the vanes.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

Where any or all of the terms "comprise", "comprises", "comprised" or "comprising" are used in this specification (including the claims) they are to be interpreted as specifying the presence of the stated features, integers, steps or components, but not precluding the presence of one or more other features, integers, steps or components.

What is claimed is:

1. A piston crown comprising:
   a piston bowl having a peripheral wall and floor that together define at least a portion of at least one circumferential recess that is disposed between the peripheral wall and a center of a piston crown of a piston in an engine cylinder, wherein a width and a depth of the recess extends along a radial direction to define a volume; and
   one or more intermediate protrusions or vanes spaced from the peripheral wall that extend outward from a floor of the piston bowl into the volume, wherein each of said one or more intermediate protrusions or vanes is disposed between a center and a peripheral wall of the piston crown and faces the center of the piston crown.

2. The piston crown of claim 1, wherein the piston crown includes the one or more vanes configured to receive one or more of fuel from a fuel injector or a gas.

3. The piston crown of claim 2, wherein the one or more vanes are configured to change a flow of the one or more of the fuel or the gas into a swirling flow.

4. The piston crown of claim 2, wherein the one or more vanes are linearly aligned with an exhaust valve in a cylinder head of the engine cylinder.

5. The piston crown of claim 2, wherein the one or more vanes are hollow.

6. The piston crown of claim 1, further comprising:
   intermediate walls spaced apart from the peripheral wall, the peripheral wall and the intermediate walls defining the at least one circumferential recess.

7. The piston crown of claim 1, further comprising:
   side walls that diverge from the center to the at least one circumferential recess.

8. A piston crown comprising:
   a piston bowl having a peripheral wall and floor that together define at least a portion of a circumferential recess that is disposed between the peripheral wall and a center of a piston crown of a piston in an engine cylinder; and
   one or more vanes spaced from the peripheral wall that extend outward from a floor of the piston bowl into a volume wherein each of said one or more vanes comprises a shape selected from the group consisting of a crest-wave shaped profile; an opened-half conical shaped profile; and a spherical shaped dome structure.

9. The piston crown of claim 8, wherein a width and a depth of the recess extends along a radial direction to define a volume.

10. The piston crown of claim 8, wherein the one or more vanes are configured to receive one or more of fuel from a fuel injector or a gas.

11. The piston crown of claim 8, wherein the one or more vanes are configured to change a flow of one or more of fuel from a fuel injector or gas into a swirling flow.

12. The piston crown of claim 8, wherein the one or more vanes are linearly aligned with an exhaust valve in a cylinder head of the engine cylinder.

13. The piston crown of claim 8, wherein the one or more vanes are hollow.

14. The piston crown of claim 8, further comprising:
   intermediate walls spaced apart from the peripheral wall, the peripheral wall and the intermediate walls defining the circumferential recess.

15. The piston crown of claim 8, further comprising:
side walls that diverge from the center to the circumferential recess.

16. A piston crown comprising:
a piston bowl having a peripheral wall and floor that together define at least a portion of a circumferential recess that is disposed between the peripheral wall and a center of a piston crown of a piston in an engine cylinder; and one or more vanes spaced from the peripheral wall that extend outward from a floor of the piston bowl into a volume, the one or more vanes configured to receive one or more of fuel from a fuel injector or a gas, wherein each of said one or more vanes is disposed between a center and a peripheral wall of the piston crown and faces the center of the piston crown, and wherein each of said one or more vanes comprises a shape selected from the group consisting of a crest-wave shaped profile; an opened-half conical shaped profile; and a spherical shaped dome structure.

17. The piston crown of claim 16, wherein a width and a depth of the recess extends along a radial direction to define a volume.

18. The piston crown of claim 16, wherein the one or more vanes are configured to change a flow of the fuel or the gas into a swirling flow.

19. The piston crown of claim 16, wherein the one or more vanes are linearly aligned with an exhaust valve in a cylinder head of the engine cylinder.

20. The piston crown of claim 16, wherein the one or more vanes are hollow.

\* \* \* \* \*